(12) United States Patent
Beltran Gracia et al.

(10) Patent No.: US 11,939,510 B2
(45) Date of Patent: *Mar. 26, 2024

(54) POLYMERISABLE LIQUID CRYSTAL MATERIAL AND POLYMERISED LIQUID CRYSTAL FILM

(71) Applicant: MERCK PATENT GMBH, Darmstadt (DE)

(72) Inventors: Eduardo Beltran Gracia, Southampton (GB); Kevin Adlem, Bournemouth (GB); Naomi Weare, Southampton (GB); Hassan Norouzi-Arasi, Southampton (GB)

(73) Assignee: MERCK PATENT GMBH, Darmstadt (DE)

( * ) Notice: Subject to any disclaimer, the term of this patent is extended or adjusted under 35 U.S.C. 154(b) by 109 days.

This patent is subject to a terminal disclaimer.

(21) Appl. No.: 16/639,007

(22) PCT Filed: Aug. 13, 2018

(86) PCT No.: PCT/EP2018/071896
§ 371 (c)(1),
(2) Date: Feb. 13, 2020

(87) PCT Pub. No.: WO2019/034590
PCT Pub. Date: Feb. 21, 2019

(65) Prior Publication Data
US 2020/0199453 A1    Jun. 25, 2020

(30) Foreign Application Priority Data
Aug. 15, 2017   (EP) .................................. 17001387

(51) Int. Cl.
| | | |
|---|---|---|
| G02F 1/1333 | (2006.01) | |
| C08F 220/38 | (2006.01) | |
| C08J 5/18 | (2006.01) | |
| C09K 19/04 | (2006.01) | |
| C09K 19/32 | (2006.01) | |

(Continued)

(52) U.S. Cl.
CPC ...... *C09K 19/3861* (2013.01); *C08F 220/387* (2020.02); *C08J 5/18* (2013.01); *C09K 19/04* (2013.01); *C09K 19/32* (2013.01); *C09K 19/54* (2013.01); *C08F 2800/20* (2013.01); *C08J 2333/14* (2013.01); *C09K 2019/0444* (2013.01); *C09K 2019/0448* (2013.01)

(58) Field of Classification Search
CPC .... C09K 19/3861; C09K 19/04; C09K 19/32; C09K 19/54; C09K 19/2007; C09K 19/2014; C09K 19/3497; C09K 2019/0444; C09K 2019/0448; C08F 220/387; C08F 2800/20; C08J 5/18; C08J 2333/14

See application file for complete search history.

(56) References Cited

U.S. PATENT DOCUMENTS 9,234,056 B2   1/2016  Sakamoto et al.
9,316,906 B2 *  4/2016  Shin .................. C07C 251/66
(Continued)

FOREIGN PATENT DOCUMENTS

EP      16169932.7     *  5/2016  ............. C09K 19/52
EP       3287819 A1       2/2018
(Continued)

OTHER PUBLICATIONS

Machine Translation of JP2014137466 (Year: 2014).*
(Continued)

*Primary Examiner* — Geraldina Visconti
(74) *Attorney, Agent, or Firm* — Millen, White, Zelano & Branigan, P.C.; Brion P. Heaney

(57) ABSTRACT

The invention relates to a polymerisable LC material comprising at least one di- or multireactive mesogenic compound of formula T,

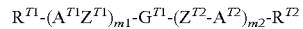

and at least one compound of formula CO-1,

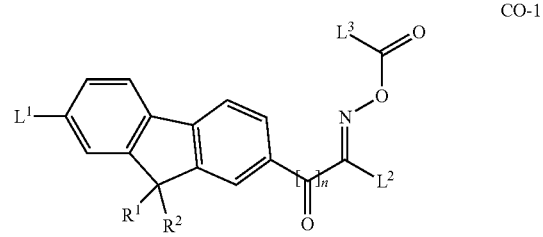

wherein the parameter are $R^{T1}$, $A^{T1}$, $Z^{T1}$, m1, $G^{T1}$, $Z^{T2}$, $A^{T2}$, m2, $R^{T2}$, $L^1$ to $L^3$, $R^1$ and $R^2$, and n are defined as given in claim 1.

Furthermore, the present invention relates also to a method for its preparation, a polymer film with improved thermal durability obtainable from the corresponding polymerisable LC material, to a method of preparation of such polymer film, and to the use of such polymer film and said polymerisable LC material for optical, electro-optical, decorative or security devices.

27 Claims, No Drawings

(51) Int. Cl.
*C09K 19/38* (2006.01)
*C09K 19/54* (2006.01)

(56) References Cited

U.S. PATENT DOCUMENTS

| | | | |
|---|---|---|---|
| 10,358,600 B2* | 7/2019 | Mulcahy | C09K 19/3852 |
| 11,203,716 B2 | 12/2021 | Sakamoto et al. | |
| 11,236,271 B2* | 2/2022 | Song | C09K 19/04 |
| 2014/0107247 A1 | 4/2014 | Sakamoto et al. | |
| 2015/0175564 A1 | 6/2015 | Sakamoto et al. | |
| 2015/0277007 A1 | 10/2015 | Matsuyama et al. | |
| 2016/0332960 A1 | 11/2016 | Oh et al. | |
| 2017/0369783 A1 | 12/2017 | Horiguchi et al. | |
| 2018/0002460 A1 | 1/2018 | Endo et al. | |
| 2018/0120487 A1 | 5/2018 | Ikeda et al. | |
| 2018/0319755 A1 | 11/2018 | Teng et al. | |
| 2019/0218459 A1* | 7/2019 | Song | C09K 19/54 |
| 2020/0199453 A1* | 6/2020 | Beltran Gracia | C09K 19/3497 |
| 2020/0291299 A1* | 9/2020 | Mulcahy | C09K 19/3857 |
| 2020/0362245 A1* | 11/2020 | Beltran Gracia | C09K 19/34 |

FOREIGN PATENT DOCUMENTS

| | | | |
|---|---|---|---|
| EP | 2845845 B1 | 7/2019 | |
| JP | 2014-137466 * | 7/2014 | ............ G03F 7/031 |
| JP | 6055569 B1 | 12/2016 | |
| WO | 15108386 A1 | 7/2015 | |
| WO | 16076652 A1 | 5/2016 | |
| WO | 16104317 A1 | 6/2016 | |
| WO | 2016114253 A1 | 7/2016 | |
| WO | 16171041 A1 | 10/2016 | |
| WO | 17079867 A1 | 5/2017 | |

OTHER PUBLICATIONS

International Search Report PCT/EP2018/ 071896 dated Nov. 20, 2018. (pp. 1-3).

Office Action in corresponding Japanese Patent Application No. 2020-508620 dated Sep. 6, 2022 (pp. 1-5).

* cited by examiner

POLYMERISABLE LIQUID CRYSTAL MATERIAL AND POLYMERISED LIQUID CRYSTAL FILM

FIELD OF INVENTION

The invention relates to a polymerisable LC material comprising at least one di- or multireactive mesogenic compound of formula T,

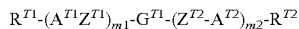

$$R^{T1}\text{-}(A^{T1}Z^{T1})_{m1}\text{-}G^{T1}\text{-}(Z^{T2}\text{-}A^{T2})_{m2}\text{-}R^{T2} \qquad T$$

and at least one compound of formula CO-1,

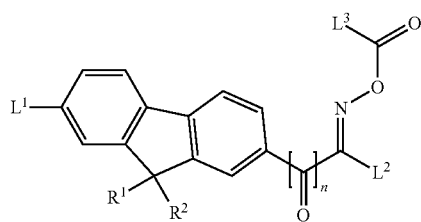

wherein the parameter are $R^{T1}$, $A^{T1}$, $Z^{T1}$, m1, $G^{T1}$, $Z^{T2}$, $A^{T2}$, m2, $R^{T2}$, $L^1$ to $L^3$, $R^1$ and $R^2$, and n are defined as given in claim 1.

Furthermore, the present invention relates also to a method for its preparation, a polymer film with improved thermal durability obtainable from the corresponding polymerisable LC material, to a method of preparation of such polymer film, and to the use of such polymer film and said polymerisable LC material for optical, electro-optical, decorative or security devices.

BACKGROUND AND PRIOR ART

Polymerizable liquid crystal materials are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular or perpendicular to the layer) or tilted.

Such optical films are described, for example, in EP 0 940 707 B1, EP 0 888 565 B1 and GB 2 329 393 B1.

Polymerisable liquid crystal (LC) materials, while stable at room temperature, can degrade when subjected to increased temperatures. For example, when heated for a period of time the optical properties such as dispersion or retardance decreases and as such, the performance of the optical film degrades over time. This can be attributed, in particular, to a low degree of polymerisation and a corresponding high content of residual free radicals in the polymer, polymer shrinkage, and/or thermo-oxidative degradation.

A high degree of polymerisation can be i.a. influenced by the choice of the utilized photoinitiator. In this regard, Nie et al. describe in J. Appl. Polym. Sci. 2012, 123, 725-731; the synthesis and photopolymerisation kinetics of suitable oxime ester photoinitiators.

JP 5054456 B2 describes polymerisable liquid crystal (LC) materials comprising one or more direactive mesogenic compounds and the commercially available photoinitiators Oxe02 available from by Ciba and N-1919 (T) available from Adeka.

In particular, the desired properties of an optical retardation film, like e.g. uniform alignment of the mesogenic compounds, film structure, film adhesion, temperature stability and optical performance, are highly dependent from the composition of the polymerisable liquid crystal material especially concerning the ratio and choice of mono- and direactive mesogenic compounds.

For example, polymer shrinkage, which is a decrease in thickness of the optical film, reduces the retardance of the passing light in accordance to $R=d\Delta n$, wherein R is the retardance, d is the thickness of the birefringent film, $\Delta n$ is the birefringence. Polymer shrinkage can e.g. be reduced by utilizing polymerisable compounds having more than one polymerizable group, e.g. di- or multireactive compounds, and therefore capable of forming a more crosslinked and more rigid polymer.

However, again, the desired properties of an optical retardation film are highly dependent from the composition of the polymerisable liquid crystal material. In this regard, one possible way to adjust the alignment profile in the direction perpendicular to the film plane is the appropriate selection of the ratio of monoreactive mesogenic compounds, i.e. compounds with one polymerizable group, and direactive mesogenic compounds, i.e. compounds with two polymerizable groups. In addition, low diacrylate content RM films are highly suitable for applications where good adhesion of the RM film to the substrate is important. However, as stated above, in low diacrylate content RM films often the optical retardation drops significantly especially due to polymer shrinkage.

Thermo-oxidative degradation is the breakdown of a polymer network catalysed by oxidation at high temperatures. As commonly known, antioxidant additives, or short antioxidants, can be used to reduce the thermo-oxidative degradation of polymers when subjected to increased temperatures. This is especially important when optical films are utilized for an in-cell application due to the high temperatures. In particular, the optical film has to endure when annealing the polyimide layer in the LC cell. In this regard, the documents WO 2009/86911 A1 and JP 5354238 B1 describe polymerisable liquid crystal (LC) materials comprising the commercially available antioxidant Irganox® 1076.

All of the above-described materials have distinct disadvantages, such as, the thermal durability of the resulting polymer films is still not high enough, their transparency to VIS-light is limited, they require the utilization of further additives, or their application bandwidth is limited, due to the utilized LC material.

Therefore, there is still the need for new and preferably improved, polymerisable liquid crystal materials or mixtures, which do not exhibit the drawbacks of prior art materials or if so, do only exhibit them to a less extent.

Advantageously, such polymerisable LC material, should preferably be applicable for the preparation of different, uniform aligned polymer networks, such as polymer films or polymer network LC applications, and should, in particular at the same time,

- show Favourable adhesion to a substrate,
- be highly transparent to VIS-light,
- exhibit an reduced yellow colouration over time (yellowing) and
- show Favourable high temperature stability or durability, and in addition, the uniform aligned polymer films should be produced by compatible, commonly known methods for the mass production.

Other aims of the present invention are immediately evident to the person skilled in the art from the following detailed description.

Surprisingly, the inventors of the present invention have found that one or more, preferably all of the above requirements aims can be achieved, preferably at the same time, by using a polymerisable LC material according to claim 1.

SUMMARY OF THE INVENTION

Thus, the invention relates to a polymerisable LC material comprising one or more compounds of formula T $$R^{T1}\text{-}(A^{T1}Z^{T1})_{m1}\text{-}G^{T1}\text{-}(Z^{T2}\text{-}A^{T2})_{m2}\text{-}R^{T2} \qquad T$$

wherein
- $R^{T1}$ and $R^{T2}$ each and independently from another denotes H or hydrocarbon group having 1 to 20 carbon atoms, the group may have a substituent group, any carbon atom may be substituted with a heteroatom, and at least one of $R^{T1}$ and $R^{T2}$ denotes P-Sp-,
- P denotes a polymerizable group
- Sp denotes a spacer group,
- $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L,
- L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms preferably 1 to 12 carbon atoms, in which one —CH$_2$— or two or more non-adjacent —CH$_2$— may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be substituted by F, or L may denote a group represented by P-Sp-
- $Z^{T1}$ and $Z^{T2}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, a single bond, or a group represented by —CR$^{O1}$R$^{O2}$O— or —OCR$^{O1}$R$^{O2}$—
- $R^{O1}$ and $R^{O2}$ each independently represent a hydrogen atom, F, Cl, Br, I, or a linear or branched alkyl group having 1 to 20 carbon atoms, preferably 1 to 12 carbon atoms, in which one —CH$_2$— or two or more non-adjacent —CH$_2$— may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be substituted with F or Cl;
- $G^{T1}$ denotes a group selected from formulae M-1 to M-8,

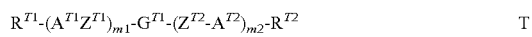

M-1

M-2

M-3

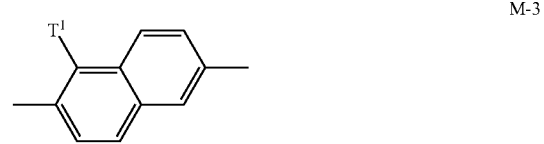

M-4

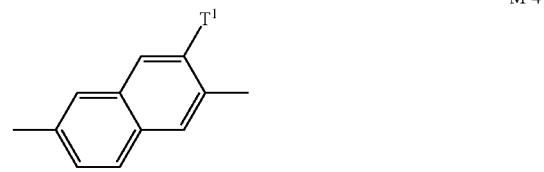

M-5

M6

M-7

-continued

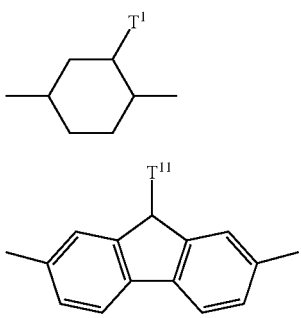

whereby these groups may be unsubstituted or substituted with one or more of the substituent groups L,
$T^1$ denotes a group selected from formulae $T^{1-1}$ and $T^{1-2}$ below,

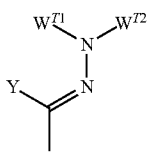

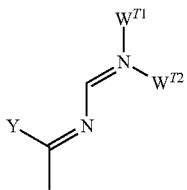

$W^{T1}$ denotes a group containing an aromatic group and/or non-aromatic group having 1 to 40 carbon atoms, preferably 1 to 20 carbon atoms, which may be substituted, the aromatic group may be a hydrocarbon ring or a heterocyclic ring, and the non-aromatic group may be a hydrocarbon group or a group in which any carbon atom in a hydrocarbon group is substituted with a heteroatom (provided that, oxygen atoms are not directly connected with each other), $W^{T2}$ denotes a hydrogen atom or a linear or branched alkyl group having 1 to 20 carbon atoms, preferably 1 to 12 carbon atoms, in which one —CH$_2$— or two or more non-adjacent —CH$_2$— groups may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be substituted with F, or $W^{T2}$ may denote a group of 2 to 30 carbon atoms having at least one aromatic group, and the group may be unsubstituted or may be substituted with one or more of substituent groups L, or $W^{T2}$ may denote a group by P-Sp-, Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms, in which one —CH$_2$— or two or more non-adjacent —CH$_2$— may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be substituted with F, or Y may represent a group represented by P-Sp-, m1 and m2 each independently represent an integer of 1 to 6, and at least one compound of formula CO-1,

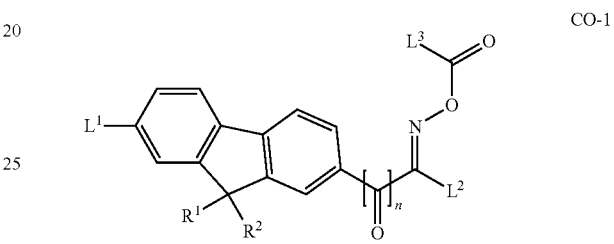

wherein $R^1$ and $R^2$ denotes H, alkyl, alkoxy or mono- oligo- or polyfluorinated alkyl or alkoxy, preferably alkyl, $L^1$ denotes H, alkyl, alkoxy, thioalkyl, alkylcarbonyl, alkoxycarbonyl, alkylcarbonyloxy or alkoxycarbonyloxy;

halogen, CN, NO$_2$, OCN, SCN, or mono- oligo- or polyfluorinated alkyl or alkoxy atoms; or -(Sp$^{31}$-A$^{31}$), preferably H, halogen, CN, or NO$_2$, $L^2$ to $L^3$ denotes H, alkyl, mono- oligo- or polyfluorinated alkyl, or -(Sp$^{31}$-A$^{31}$), preferably H, alkyl, or -(Sp$^{31}$-A$^{31}$), Sp$^{31}$ denotes a spacer group or a single bond, preferably a single bond or $C_{1-12}$ alkylene radical, more preferably a single bond or $C_{1-6}$ alkylene radical, most preferably a single bond or $C_{1-2}$ alkylene radical, and $A^{31}$ denotes an aryl, heteroaryl, (non-aromatic) alicyclic and heterocyclic group, optionally having one or more substituents, which are selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups, preferably phenyl, cyclohexyl, or cyclopentyl n denotes 0 or 1, preferably 1.

Further, the invention also relates to a corresponding method of production for the polymerisable LC material.

The invention further relates to a polymer network or polymer film obtainable, preferably obtained, from the polymerisable LC material, as described above and below and to a method of production of a polymer film, as described above and below.

The utilization of compounds of formula CO-1 as photoinitiators in a polymerisable LC material as described above and below, in particular in combination with compounds of formula T, preferably leads to a polymer film with increased thermal durability.

Thus, the invention further relates to a method of increasing the durability of a polymer film, obtainable, preferably obtained, from a polymerisable LC material as described above and below, by adding a compound of formula CO-1 to the LC material before polymerisation.

The invention further relates to the use of a polymer network or polymer film or polymerisable LC material, as described above and below, in optical, electrooptical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes.

The invention further relates to a optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one polymer network or polymer film or polymerisable LC material, as described above and below The invention further relates to a liquid crystal display comprising at least one polymer network or polymer film or polymerisable LC material or an optical component, as described above and below.

The invention further relates to authentification, verification or security marking, coloured or multicolour image for security use, non-forgeable object or document of value like an identity or credit card or a banknote, comprising a polymer network or polymer film or polymerisable LC material or a optical component as described above and below.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" or "non-polymerisable" compounds.

The term "non-mesogenic compound or material" means a compound or material that does not contain a mesogenic group as defined above.

Visible light is electromagnetic radiation that has wavelength in a range from about 400 nm to about 740 nm. Ultraviolet (UV) light is electromagnetic radiation with a wavelength in a range from about 200 nm to about 450 nm.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to Film wherein the optical axis is substantially perpendicular to the film plane.

The term "planar structure" or "planar orientation" refers to Film wherein the optical axis is substantially parallel to the film plane.

The term "negative (optical) dispersion" refers to a birefringent or liquid crystalline material or layer that displays reverse birefringence dispersion where the magnitude of the birefringence ($\Delta n$) increases with increasing wavelength ($\lambda$). I.e. $|\Delta n\ (450)|<|\Delta n\ (550)|$, or $\Delta n\ (450)/\Delta n\ (550)<1$, where $\Delta n\ (450)$ and $\Delta n\ (550)$ are the birefringence of the material measured at wavelengths of 450 nm and 550 nm respectively. In contrast, positive (optical) dispersion" means a material or layer having $|\Delta n\ (450)|>|\Delta n\ (550)|$ or $\Delta n\ (450)/\Delta n\ (550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [$R(\lambda)=\Delta n(\lambda)\cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, R (450)/R (550) is equal to $\Delta n\ (450)/\Delta n\ (550)$. Thus, a material or layer with negative or reverse dispersion has R (450)/R (550)<1 or |R (450)|<|R (550)|, and a material or layer with positive or normal dispersion has R (450)/R (550)>1 or |R (450)|>|R (550)|.

In the present invention, unless stated otherwise "optical dispersion" means the retardation dispersion i.e. the ratio R (450)/R (550).

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data, it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, NE, USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising Film of optically uniaxial birefringent material with negative birefringence, such as discotic anisotropic materials is also referred to as "negative A (or C) plate" or "−A (or −C) plate" depending on the orientation of the discotic materials. Film made from a cholesteric calamitic material with a reflection band in the UV part of the spectrum also has the optics of a negative C plate.

The birefringence $\Delta n$ is defined as follows $$\Delta n = n_e - n_o$$

wherein $n_e$ is the extraordinary refractive index and $n_o$ is the ordinary refractive index, and the average refractive index $n_{av.}$ is given by the following equation:

$$n_{av.}=((2n_o^2+n_e^2)/3)^{1/2}$$

The average refractive index $n_{av.}$ and the ordinary refractive index $n_o$ can be measured using an Abbe refractometer. $\Delta n$ can then be calculated from the above equations.

Unless the context clearly indicates otherwise, as used herein plural forms of the terms herein are to be construed as including the singular form and vice versa.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm In case of doubt the definitions as given in C. Tschierske, G. Pelzi and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—)

or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ aryl-alkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or poly-cyclic, i.e. contain a plurality of rings (such as, for example, decahydro-naphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl. The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

"Substituted silyl or aryl" preferably means substituted by halogen, —CN, $R^y$, —$OR^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

In the formula shown above and below, a substituted phenylene ring

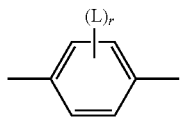

is preferably

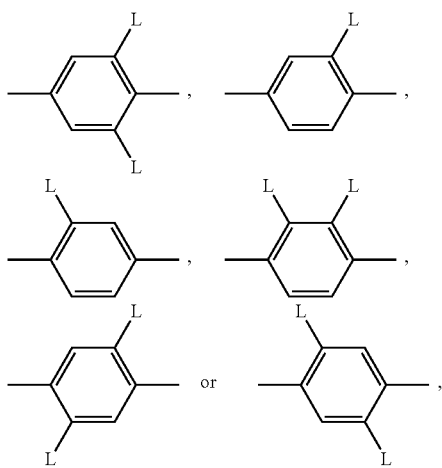

in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

"Polymerisable groups" (P) are preferably selected from groups containing a C=C double bond or C≡C triple bond, and groups which are suitable for polymerisation with ring opening, such as, for example, oxetane or epoxide groups.

Preferably, polymerisable groups (P) are selected from the group consisting of $CH_2$=$CW^1$—COO—, $CH_2$=$CW^1$—CO—,

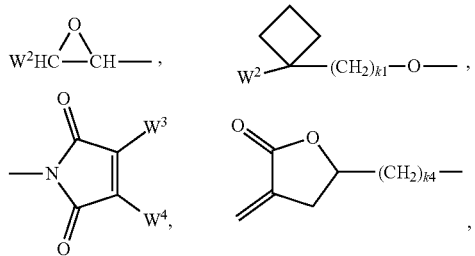

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$-, Phe-CH=CH—, in which $W^1$ denotes H, F, C, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2$=CH—COO—, $CH_2$=C($CH_3$)—COO—, $CH_2$=CF—COO—, $CH_2$=CH—$CH_2$=CH—O—, ($CH_2$=CH)$_2$CH—OCO—, ($CH_2$=CH)$_2$CH—O—,

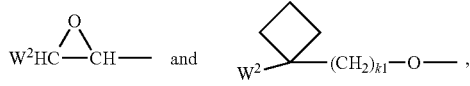

in which $W^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

| | |
|---|---|
| —X-alkyl-CHP$^x$—CH$_2$—CH$_2$P$^y$ | I*a |
| —X-alkyl-C(CH$_2$P$^x$)(CH$_2$P$^y$)—CH$_2$P$^z$ | I*b |
| —X-alkyl-CHP$^x$CHP$^y$—CH$_2$P$^z$ | I*c |
| —X-alkyl-C(CH$_2$P$^x$)(CH$_2$P$^y$)—C$_{aa}$H$_{2aa+1}$ | I*d |
| —X-alkyl-CHP$^x$—CH$_2$P$^y$ | I*e |
| —X-alkyl-CHP$^x$P$^y$ | I*f |
| —X-alkyl-CP$^x$P$^y$—C$_{aa}$H$_{2aa+1}$ | I*g |
| —X-alkyl-C(CH$_2$P$^y$)(CH$_2$P$^x$)—CH$_2$OCH$_2$—C(CH$_2$P$^x$)(CH$_2$P$^y$)CH$_2$P$^z$ | I*h |
| —X-alkyl-CH((CH$_2$)$_{aa}$P$^x$)((CH$_2$)$_{bb}$P$^y$) | I*i |
| —X-alkyl-CHP$^x$CHP$^y$—C$_{aa}$H$_{2aa+1}$ | I*k | in which
  alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—C—, —O—CO—, —O—CO—O— in such a way that O and/or S atoms are not linked directly to one another, and in which, in addition, one or more H atoms may be replaced by F, Cl or CN, where R$^x$ has one the above-mentioned meaning,
  $_{aa}$ and $_{bb}$ each, independently of one another, denote 0, 1, 2, 3, 4, 5 or 6,
  X has one of the meanings indicated for X', and
  P$^y$ to P$^z$ each, independently of one another, have one of the meanings indicated above for P.

Preferred spacer groups Sp are selected from the formula Sp'-X', so that the radical "P-Sp-" conforms to the formula "P-Sp'-X'-", where
  Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{xx}$—, —SiR$^{xx}$R$^{yy}$—, —CO—, —COO—, —OCO—, —OCO—O—, —S—CO—, —CO—S—, —NR$^{xx}$—CO—O—, —O—CO—NR$^{Oxx}$—, —NR$^{xx}$—CO—NR$^{yy}$—, —CH=CH— or —C≡C— in such a way that 0 and/or S atoms are not linked directly to one another,
  X' denotes —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{xx}$—, —CY$^{xx}$=CY$^{yy}$—, —C≡C—, —CH=CH—COO—, —OCO—CH=CH— or a single bond,
  R$^{xx}$ and R$^{yy}$ each, independently of one another, denote H or alkyl having 1 to 12 C atoms, and
  Y$^{xx}$ and Y$^{yy}$ each, independently of one another, denote H, F, Cl or CN.

X' is preferably —O—, —S—CO—, —COO—, —OCO—, —O—COO—, —CO—NR$^{xx}$—, —NR$^{xx}$—CO—, —NR$^{xx}$—CO—NR$^{yy}$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{xx}$R$^{yy}$—O)$_{p1}$—, in which p1 is an integer from 1 to 12, q1 is an integer from 1 to 3, and R$^{xx}$ and R$^{yy}$ have the above-mentioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

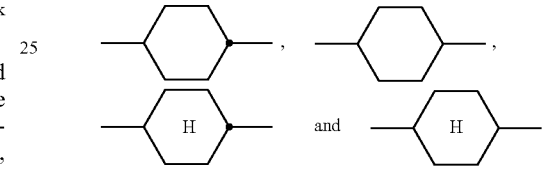

denote trans-1,4-cyclohexylene, and

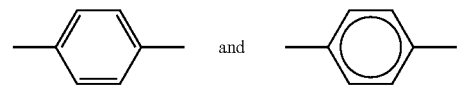

denote 1,4-phenylene.

For the present invention the groups —COO— or —CO$_2$— denote an ester group of formula

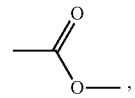

and the groups —OCO—, —O$_2$C— or —OOC— denote an ester group of formula

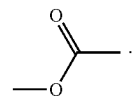

A "polymer network" is a network in which all polymer chains are interconnected to form a single macroscopic entity by many crosslinks.

The polymer network can occur in the following types:
  A graft polymer molecule is Branched polymer molecule in which one or more the side chains are different, structurally or configurationally, from the main chain.
  A star polymer molecule is Branched polymer molecule in which a single branch point gives rise to multiple linear chains or arms. If the arms are identical, the star polymer molecule is said to be regular. If adjacent arms are composed of different repeating subunits, the star polymer molecule is said to be variegated.

A comb polymer molecule consists of a main chain with two or more three-way branch points and linear side chains. If the arms are identical the comb polymer molecule is said to be regular.

Brush polymer molecule consists of a main chain with linear, unbranched side chains and where one or more of the branch points has four-way functionality or larger.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius and all temperature differences are quoted in differential degrees.

DETAILED DESCRIPTION

Preferred carbazole oxime ester photoinitiators of formula CO-1 are selected from the group of compounds of the following formulae

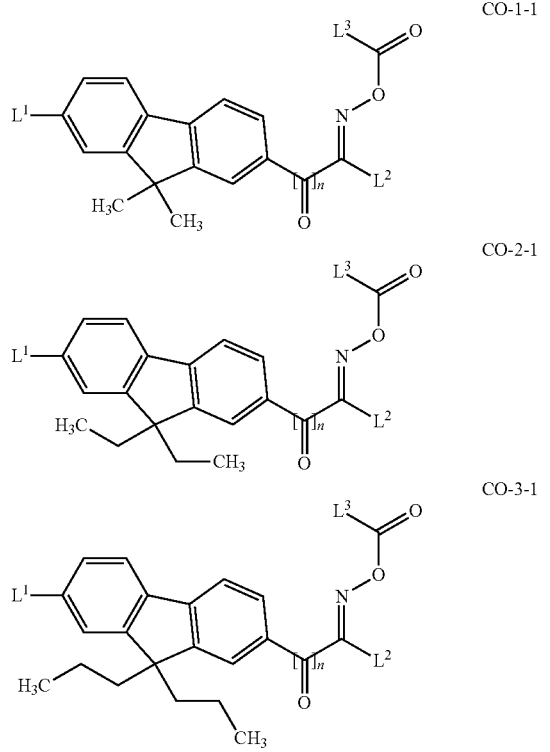

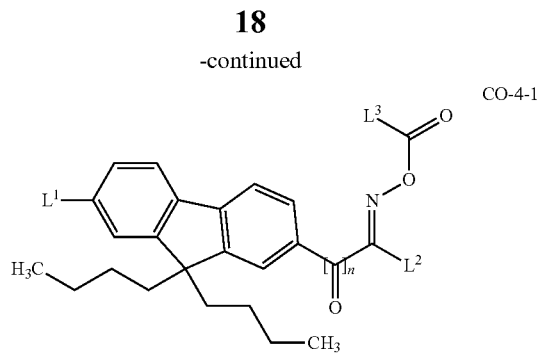

wherein $L^1$ denotes H, Br, CN, or $NO_2$; $L^2$, $L^3$ and n have one of the meanings as given in formula CO-1.

Especially preferred are carbazole oxime ester photoinitiators selected from the following formulae,

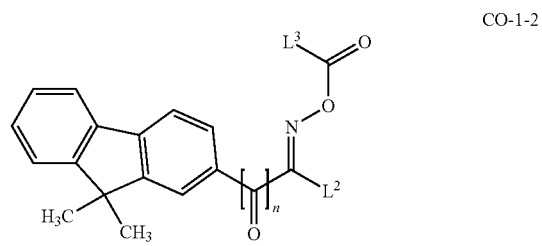

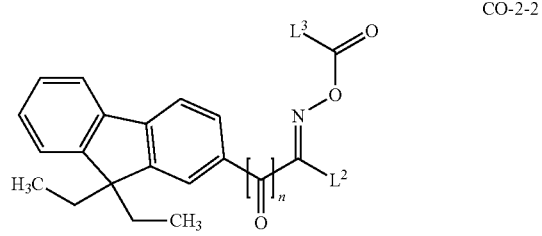

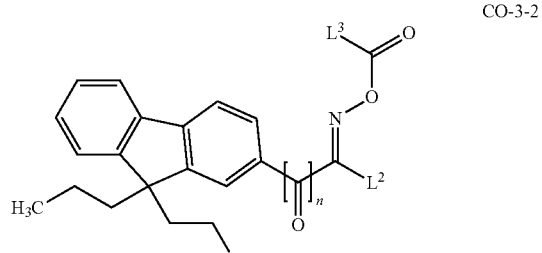

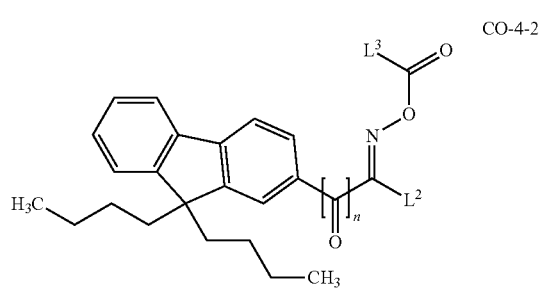

wherein $L^2$ and $L^3$ and n have one of the meanings as given above under formula CO-1.

In particular preferred are carbazole oxime ester photoinitiators selected from the following formula,

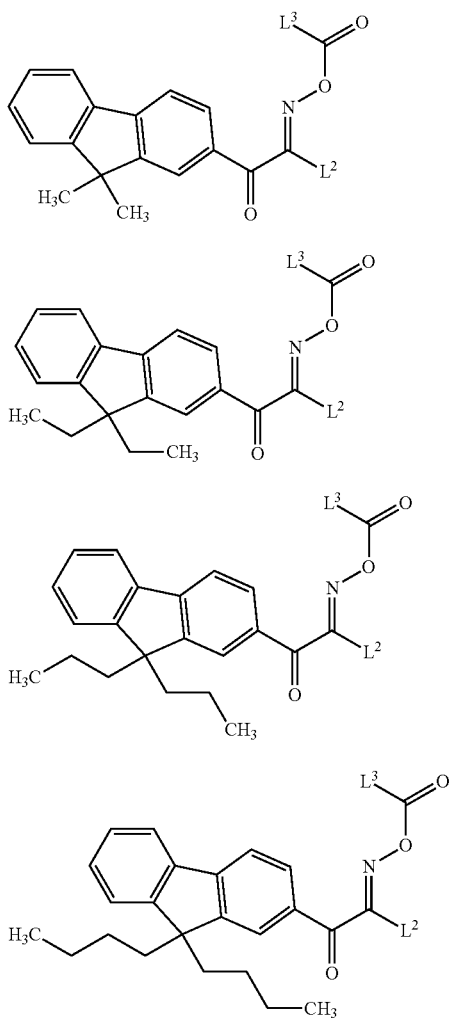

CO-1-3

CO-2-3

CO-3-3

CO-4-3 wherein $L^2$ and $L^3$ have one of the meanings as given above under formula CO-1.

Further preferred are carbazole oxime ester photoinitiators selected from the following formula CO-19 to CO-26,

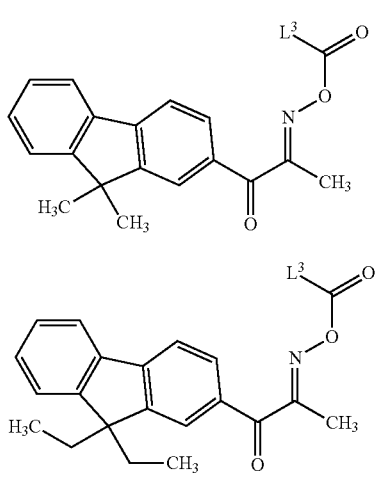

CO-1-4

CO-2-4

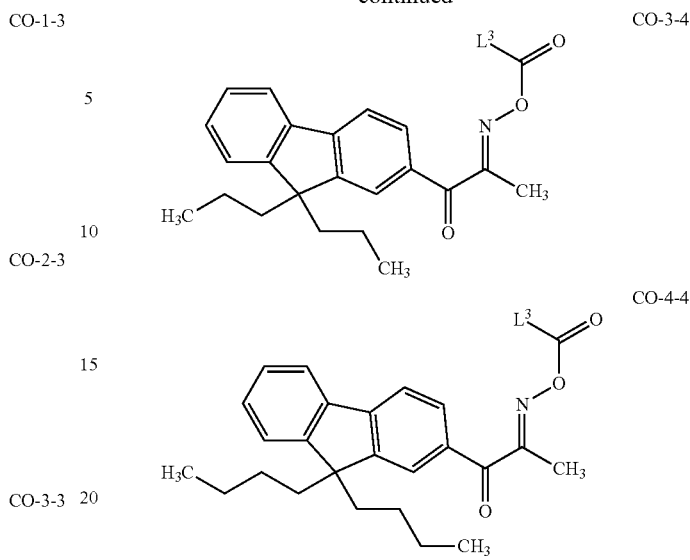

CO-3-4

CO-4-4 wherein $L^3$ has one of the meanings as given above under formula CO-1 and preferably denotes alkyl or 1,4-phenyl.

The compounds of the formulae CO-1 and sub-formulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Preferably, the compounds of formula CO-1 and sub-formulae thereof can be pre-pared analogously to the processes disclosed in WO2016/076652 A1, WO 2015/108386 A1 or EP 2 845 845 A1.

Preferably the minimum amount of carbazole oxime ester photoinitiators of formula CO-1 in the polymerisable LC material as a whole is more than 0.3%, more preferably more than 0.5%, even more preferably more than 0.8%, and most preferably 0.9% of the total mixture.

Preferably, the maximum amount of carbazole oxime ester photoinitiators of formula CO-1, is preferably less than 5%, very preferably less than 3%, in particular less than 2% by weight of the whole polymerisable LC material.

Preferably the compounds of formula T are selected from the group of compounds wherein at least one of $R^{T1}$ and $R^{T2}$ denotes P-Sp- and the other $R^{T1}$ or $R^{T2}$ denotes preferably a hydrogen atom, F, Cl, Br, I a pentafluorosulfuranyl group, a cyano group, a nitro group, an isocyano group, a thioisocyano group, or a linear or branched alkyl group having 1 to 20 carbon atoms, in which any hydrogen atom in the group may be substituted with F and one —$CH_2$— or two or more non-adjacent —$CH_2$— may be each independently substituted with —O—, —S—, —$OCH_2$—, —$CH_2O$—, —CO—, —COO—, —OCO—, —CO—S—, —S—CO—, —O—CO—C—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, or —C≡C—, more preferably a hydrogen atom, F, Cl, or a linear or branched alkyl group having 1 to 12 carbon atoms, in which one —$CH_2$— or two or more non-adjacent —$CH_2$— may be each independently substituted with —C—, —COO—, —OCO—, or —O—CO—C—, even more preferably a hydrogen atom, F, Cl, or a linear alkyl group or linear alkoxy group having 1 to 8 carbon atoms, and particularly preferably a linear alkyl group or linear alkoxy group having 1 to 8 carbon atoms.

In another preferred embodiment, both $R^{T1}$ and $R^{T2}$ denote P-Sp-.

In further preferred embodiment $A^{T1}$ and $A^{T2}$ in formula T each independently in each occurrence denotes preferably a 1, 4-phenylene group, a 1,4-cyclohexylene group, or a naphthalene-2, 6-diyl group, which may be unsubstituted or may be substituted each and independently in each occurrence with one or more of the substituent groups L:

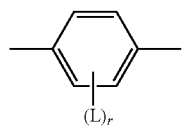

A-I

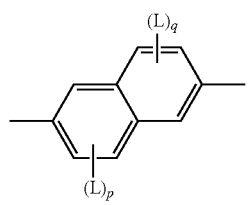

A-II

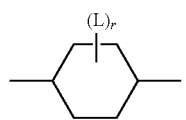

A-III wherein r denotes an integer between 0 and 4, p and q denotes each and independently an integer between 0 and 3.

In Further preferred embodiment $A^{T1}$ and $A^{T2}$ in formula T each independently and in each occurrence denote a group selected from formulae A-1 to A-11 below,

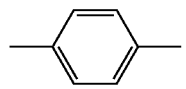

A-1

A-2

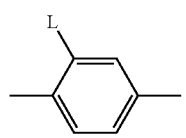

A-3

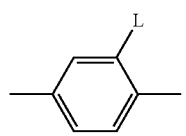

A-4

-continued

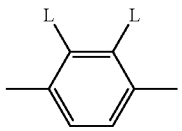

A-5

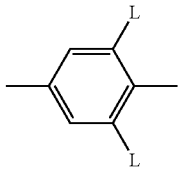

A-6

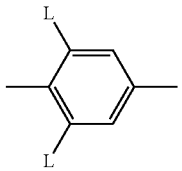

A-7

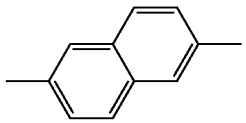

A-8

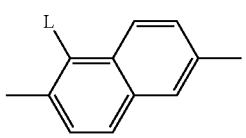

A-9

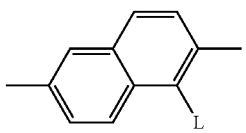

A-10

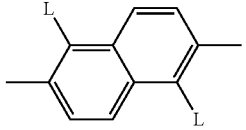

A-11 further preferred a group selected from formulae (A-1) to (A-8), and particularly preferred a group selected from formulae (A-1) to (A-4).

In a preferred embodiment, the group $A^{T1}$ connected to the group $Z^{T1}$ adjacent to the group $G^{T1}$ and the group represented by $A^{T2}$ connected to the group $Z^{T2}$ adjacent to the group $G^{T1}$, $A^{T1}$ and $A^{T2}$ each independently denote preferably a 1, 4-cyclohexylene group, which may be unsubstituted or may be substituted with one or more of the substituent groups L (A-III), and more preferably a group represented by formula A-2.

In another preferred embodiment and when a plurality of the groups $A^{T1}$ and $A^{T2}$ exist, the group represented by $A^{T1}$ and $A^{T2}$ is selected independently from $A^{T1}$ and $A^{T2}$ adjacent to $G^{T1}$, groups $A^{T1}$ and $A^{T2}$ non-adjacent or adjacent to $G^{T1}$ may be identical of different and each independently represent preferably a 1, 4-phenylene group or a naphthalene-2, 6-diyl group which may be unsubstituted or may be substituted with one or more of the substituent groups L, more preferably a group selected from formulae (A-1) and (A-3) to (A-11), further preferably a group selected from formulae (A-1) and (A-3) to (A-8), and particularly preferably a group selected from formulae (A-1), (A-3), and (A-4).

$Z^{T1}$ and $Z^{T2}$ denote each independently in each occurrence —C—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—C—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, a single bond, or a group represented by —CR$^{O1}$R$^{O2}$O— or —OCR$^{O1}$R$^{O2}$— wherein, R$^{O1}$ and R$^{O2}$ each independently have the same meaning as R$^{O1}$ and R$^{O2}$ in formula T.

If a plurality of $Z^{T1}$ exist, they may be different from each other or identical to each other, if a plurality of $Z^{T2}$ exist, they may be different from each other or identical to each other.

In another preferred embodiment and when a plurality of $Z^{T1}$ and $Z^{T2}$ exist, preferably, at least one of $Z^{T1}$ and $Z^{T2}$ directly connected to the $G^{T1}$ group contained in formula T denotes a single bond and the other group of $Z^{T1}$ and $Z^{T2}$ is represented by —COO—, —OCO—, —CR$^{O1}$R$^{O2}$O— or —OCR$^{O-1}$R$^{O2}$— wherein, R$^{O1}$ and R$^{O2}$ each independently have the same meaning as R$^{O1}$ and R$^{O2}$ in formula T.

In another preferred embodiment, $Z^{T1}$ and $Z^{1T2}$ directly connected to the $G^{T1}$ group contained in formula T denotes a group represented by —COO—, —OCO—, —CR$^{O1}$R$^{O2}$O— or —OCR$^{O1}$R$^{O2}$—, wherein, R$^{O1}$ and R$^{O2}$ each independently have the same meaning as R$^{O1}$ and R$^{O2}$ in formula T.

Further, when a plurality of $Z^{T1}$ and $Z^{T2}$ exist, preferable groups other than the group represented by —CR$^{O1}$R$^{O2}$O— or —OCR$^{O1}$R$^{O2}$—each independently represent preferably —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —CH=CH—, —CF=CF—, —C≡C—, —C=C—, or a single bond, more preferably —OCH$_2$—, —CH$_2$O—, —COO—, —OCO—, —CF$_2$O—, —OCF$_2$—, —CH$_2$CH$_2$—, —COO—CH$_2$CH$_2$—, —OC$_0$—CH$_2$CH$_2$—, —CH$_2$CH$_2$—COO—, —CH$_2$CH$_2$—OCO—, —CH=CH—, —C≡C—, or a single bond, further preferably —OCH$_2$—, —CH$_2$O—, —COO—, —OCO—, —CF$_2$O—, —OCF$_2$—, or a single bond, more preferably —OCH$_2$—, —CH$_2$O—, —COO—, —OCO—, or a single bond, and particularly preferably —OCH$_2$—, —CH$_2$O—, —COO—, or —OCO—.

In formula T, m1 and m2 each independently represent an integer of 1 to 6, preferably m1+m2 denotes an integer of 1 to 6.

More preferably m1 and m2 each independently represent an integer of 1 to 3, and particularly preferably an integer of 1 or 2. Preferably, m1 and m2 are identical to each other, however it is likewise preferred that m1 and m2 are different.

Each of the groups represented by formulae (M-1) to (M-8) as given above is preferably selected from the group of formulae (M-1-1) to (M-9-1) as given below:

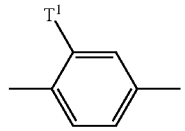
M-1-1

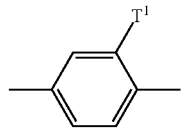
M-2-1

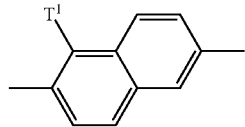
M-2-1

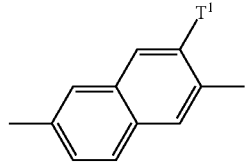
M-4-1

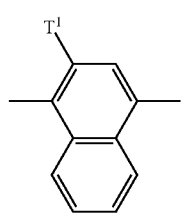
M-5-1

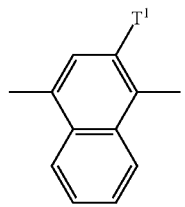
M-6-1

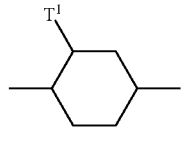
M-7-1

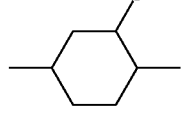
M-8-1

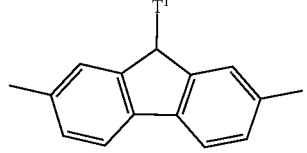
M-9-1 wherein, $T^1$ has the same meaning as given above, more preferably a group selected from formulae (M-1-1) to (M-9-1), and especially preferably a group represented by formula (M-1-1), (M-2-1) or (M-9-1) and in particular a group represented by formula (M-1-1) or (M-2-1).

In formulae (T¹⁻¹) or (T¹⁻²), preferably, Y denotes a hydrogen atom, F, Cl, a nitro group, a cyano group, a linear or branched alkyl group having 1 to 20 carbon atoms, in which any hydrogen atom in the group may be substituted with F and one —CH₂— or two or more non-adjacent —CH₂— may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or a group represented by P-Sp-, more preferably, Y denotes a hydrogen atom or a linear or branched alkyl group having 1 to 15 carbon atoms, in which any hydrogen atom in the group may be substituted with F and one —CH₂— or two or more non-adjacent —CH₂— may be each independently substituted with —O—, —COO—, or —OCO—, further preferably, Y denotes a hydrogen atom or a linear or branched alkyl group having 1 to 10 carbon atoms, in which any hydrogen atom in the group may be substituted with F, and particularly preferably, Y denotes a hydrogen atom or a linear alkyl group having 1 to 8 carbon atoms.

The aromatic group contained in $W^{T1}$ denotes preferably a group selected from formulae (W-1) to (W-18) below each of which may be unsubstituted or substituted with one or more of substituent groups L:

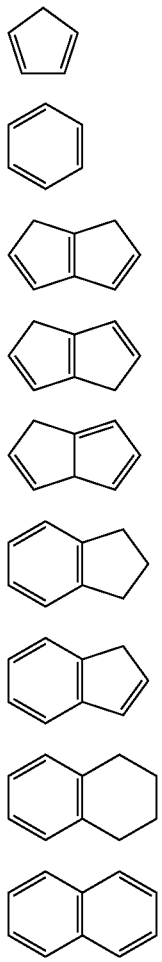

W-1
W-2
W-3
W-4
W-5
W-6
W-7
W-8
W-9

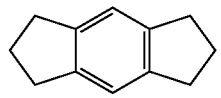

W-10

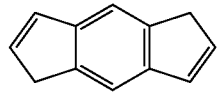

W-11

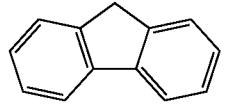

W-12

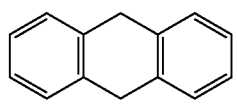

W-13

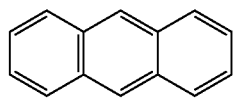

W-14

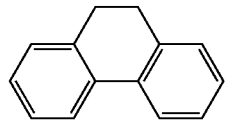

W-15

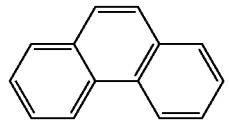

W-16

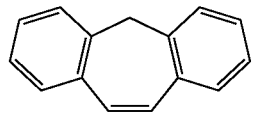

W-17

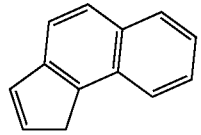

W-18 wherein, the ring structure may have a bond to T¹⁻¹ or T¹⁻² at any position thereof, a group in which two or more aromatic groups selected from these groups are linked by a single bond may be formed, any —CH= may be each independently substituted with —N=, and —CH²— may be each independently substituted with —O—, —S—, —NR^T— wherein, R^T denotes a hydrogen atom or an alkyl group having 1 to 20 carbon atoms, —CS—, or —CO—, provided that these groups do not contain a —O—O— bond. Further, these groups may be unsubstituted or may be substituted with one or more of the aforementioned substituent groups L.

The group represented by formula (W-1) denotes preferably a group selected from formulae (W-1-1) to (W-1-8) below each of which may be unsubstituted or may be substituted with one or more of the aforementioned substituent groups L:

W-1-1 

W-1-2 

W-1-3 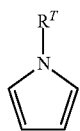

W-1-4 

W-1-5 

W-1-6 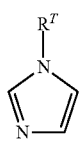

W-1-7 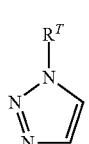

W-1-8 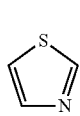

wherein, these groups may have a bond a bond to $T^{1-1}$ or $T^{1-2}$ at any possible position, and $R^T$ denotes a hydrogen atom or an alkyl group having 1 to 8 carbon atoms.

The group represented by formula (W-2) denotes preferably a group selected from formulae (W-2-1) to (W-2-8) below each of which may be unsubstituted or may be substituted with one or more of the aforementioned substituent groups L:

W-2-1 

W-2-2 

W-2-3 

W-2-4 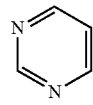

W-2-5 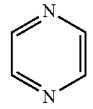

W-2-6 

W-2-7 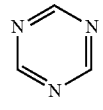

W-2-8 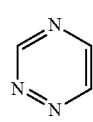

wherein, these groups have a bond a bond to $T^{1-1}$ or $T^{1-2}$ at any possible position.

The group represented by formula (W-3) denotes preferably a group selected from formulae (W-3-1) to (W-3-6) below each of which may be unsubstituted or may be substituted with one or more of the aforementioned substituent groups L:

W-3-1 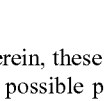

W-3-2

W-3-3 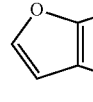

W-3-4 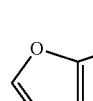

W-3-5 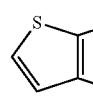

W-3-6 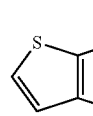

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-4) denotes preferably a group selected from formulae (W-4-1) to (W-4-9) below each of which may be unsubstituted or may be substituted with one or more of the aforementioned substituent groups L:

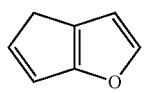
W-4-1

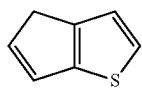
W-4-2

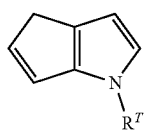
W-4-3

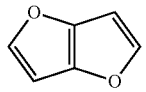
W-4-4

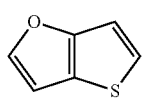
W-4-5

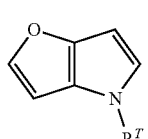
W-4-6

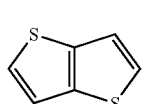
W-4-7

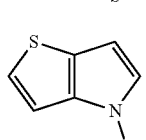
W-4-8

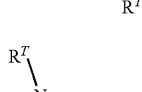
W-4-9 wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-5) is preferably a group selected from formulae (W-5-1) to (W-5-13) below each of which may be unsubstituted or may be substituted with one or more of the aforementioned substituent groups L:

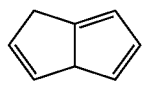
W-5-1

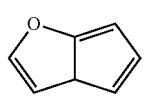
W-5-2

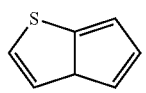
W-5-3

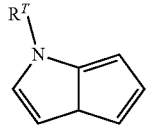
W-5-4

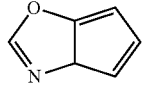
W-5-5

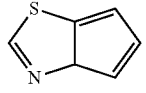
W-5-6

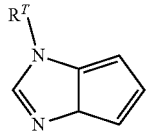
W-5-7

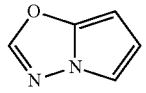
W-5-8

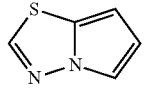
W-5-9

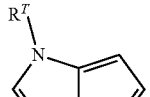
W-5-10

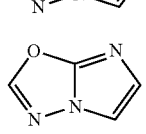
W-5-11

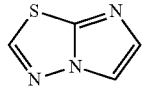
W-5-12

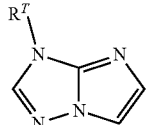
W-5-13 wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-6) denotes preferably a group selected from formulae (W-6-1) to (W-6-12) below each of which may be unsubstituted or may be substituted with one or more of the aforementioned substituent groups L:

W-6-1
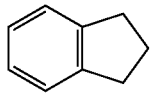

W-6-2
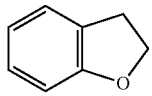

W-6-3
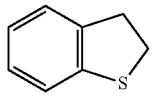

W-6-4
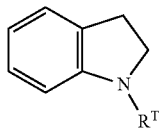

W-6-5
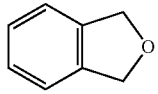

W-6-6
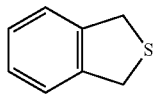

W-6-7
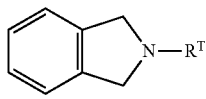

W-6-8
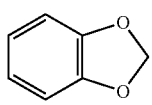

W-6-9
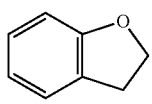

W-6-10
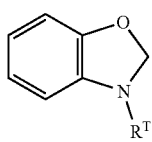

W-6-11
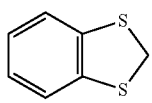

W-6-12
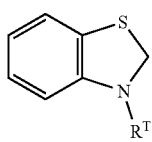

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-7) denotes preferably a group selected from formulae (W-7-1) to (W-7-8) below each of which may be unsubstituted or may be substituted with one or more of the aforementioned substituent groups L:

W-7-1
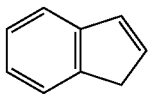

W-7-2
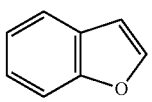

W-7-3
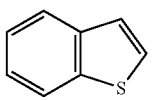

W-7-4
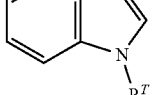

W-7-5
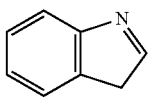

W-7-6
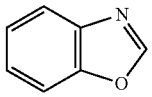

W-7-7
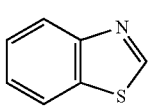

W-7-8
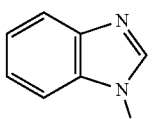

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-8) denotes preferably a group selected from formulae (W-8-1) to (W-8-19) below each of which may be unsubstituted or may be substituted with one or more of the aforementioned substituent groups L:

W-8-1
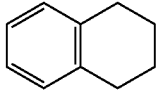

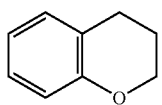

W-8-2

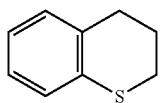

W-8-3

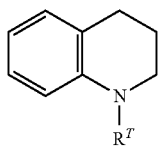

W-8-4

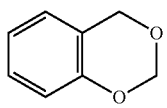

W-8-5

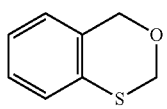

W-8-6

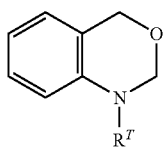

W-8-7

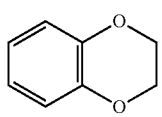

W-8-8

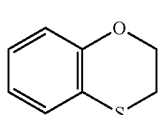

W-8-9

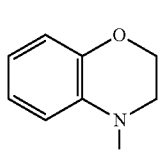

W-8-10

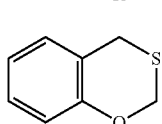

W-8-11

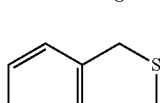

W-8-12

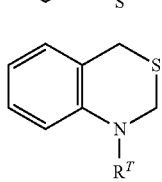

W-8-3

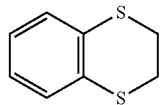

W-8-4

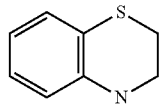

W-8-15

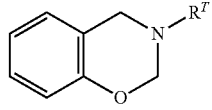

W-8-16

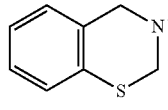

W-8-17

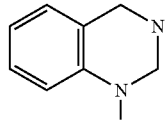

W-8-18

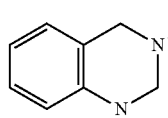

W-8-19 wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-9) denotes preferably a group selected from formulae (W-9-1) to (W-9-7) below each of which may be unsubstituted or may be substituted with one or more of the aforementioned substituent groups L:

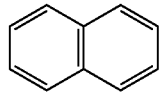

W-9-1

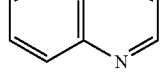

W-9-2

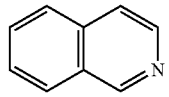

W-9-3

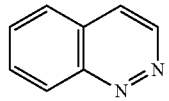

W-9-4

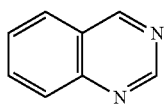
W-9-5
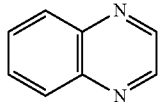
W-9-6
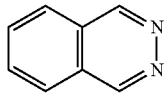
W-9-7
wherein, these groups may have a bond to $T^{1-1}$ or $T^{1-2}$ at any possible position.
The group represented by formula (W-10) denotes preferably a group selected from formulae (W-10-1) to (W-10-16) below each of which may be unsubstituted or may be substituted with one or more of the aforementioned substituent groups L:
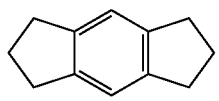
W-10-1
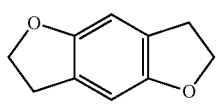
W-10-2
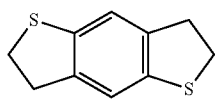
W-10-3
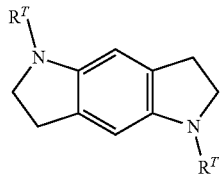
W-10-4
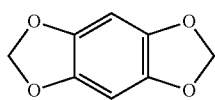
W-10-5
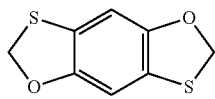
W-10-6
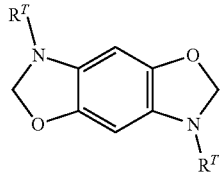
W-10-7
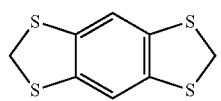
W-10-8
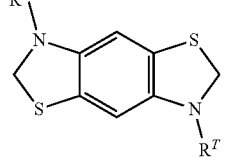
W-10-9
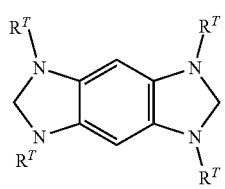
W-10-10
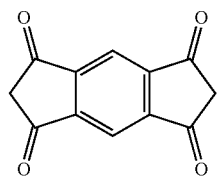
W-10-11
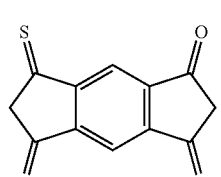
W-10-12
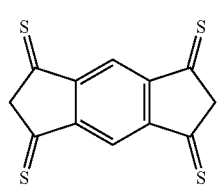
W-10-13
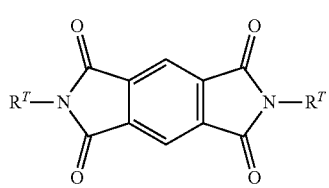
W-10-14
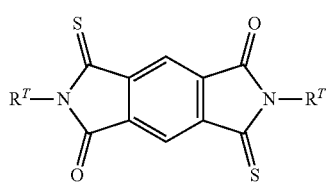
W-10-15
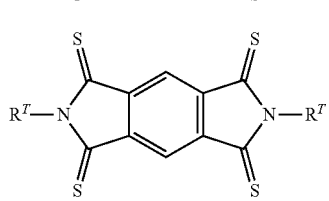
W-10-16 wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-11) denotes preferably a group selected from formulae (W-11-1) to (W-11-10) below each of which may be unsubstituted or may be substituted with one or more of the aforementioned substituent groups L:

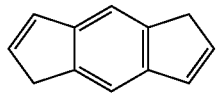
W-11-1

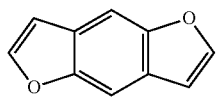
W-11-2

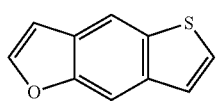
W-11-3

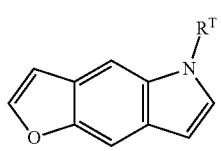
W-11-4

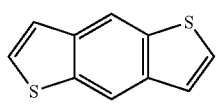
W-11-5

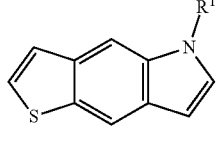
W-11-6

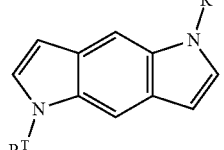
W-11-7

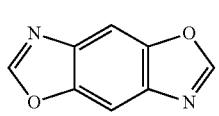
W-11-8

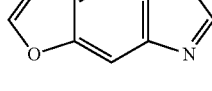
W-11-9

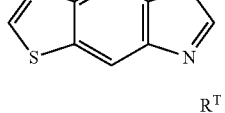
W-11-10

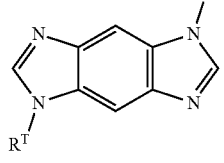

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-12) denotes preferably a group selected from formulae (W-12-1) to (W-12-4) below each of which may be unsubstituted or may be substituted with one or more of the aforementioned substituent groups L:

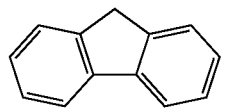
W-12-1

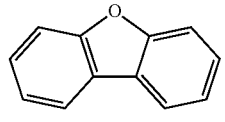
W-12-2

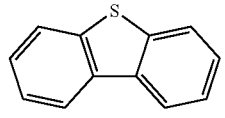
W-12-3

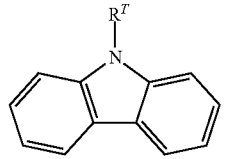
W-12-4 wherein, these groups may have a bond to $T^{1-1}$ or $T^{1-2}$ at any possible position, and RT denotes a hydrogen atom or an alkyl group having 1 to 8 carbon atoms.

The group represented by formula (W-13) denotes preferably a group selected from formulae (W-13-1) to (W-13-10) below each of which may be unsubstituted or may be substituted with one or more of the aforementioned substituent groups L:

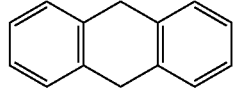
W-13-1

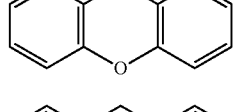
W-13-2

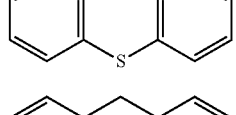
W-13-3

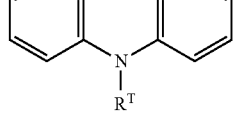
W-13-4

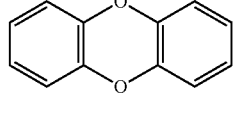
W-13-5

W-13-6
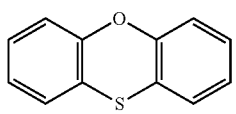

W-13-7
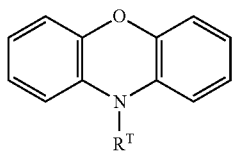

W-13-8
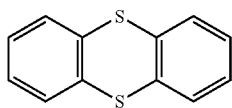

W-13-9
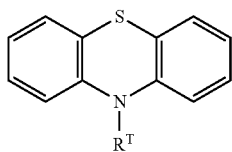

W-13-10
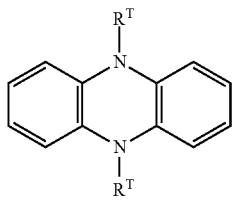

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-18) denotes preferably a group selected from formulae (W-18-1) to (W-18-7) below each of which may be unsubstituted or may be substituted with one or more of the aforementioned substituent groups L:

W-18-1
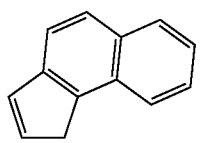

W-18-2
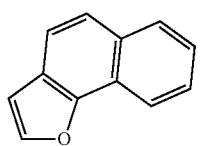

W-18-3
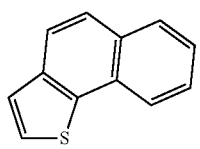

W-18-4
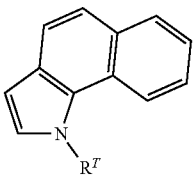

W-18-5
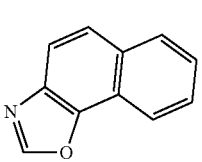

W-18-6
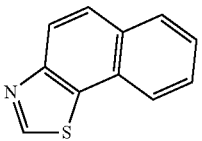

W-18-7
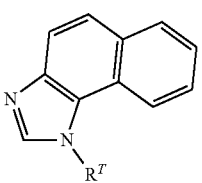

wherein, these groups may have a bond to $T^{1-1}$ or $T^{1-2}$ at any possible position, and $R^T$ denotes a hydrogen atom or an alkyl group having 1 to 8 carbon atoms.

The group containing the carbon ring or heterocyclic ring contained in $W^{T1}$ denotes preferably a group selected from formulae (W-1-1), (W-1-2), (W-1-3), (W-1-4), (W-1-5), (W-1-6), (W-2-1), (W-6-9), (W-6-11), (W-6-12), (W-7-2), (W-7-3), (W-7-4), (W-7-6), (W-7-7), (W-7-8), (W-9-1), (W-12-1), (W-12-2), (W-12-3), (W-12-4), (W-13-7), (W-13-9), (W-13-10), (W-14) and (W-18-6) each of which may be unsubstituted or may be substituted with one or more of the aforementioned substituent groups L, more preferably a group selected from formulae (W-2-1), (W-7-3), (W-7-7), (W-14) and (W-18-6) each of which may be unsubstituted or may be substituted with one or more of the aforementioned substituent groups L, further preferably a group selected from formulae (W-7-3), (W-7-7), (W-14) and (W-18-6) each of which may be unsubstituted or may be substituted with one or more of the aforementioned substituent groups L, still further preferably a group represented by formula (W-7-7), which may be unsubstituted or may be substituted with one or more of the aforementioned substituent groups L, and particularly preferably a group represented by formula (W-7-7-1) which may be unsubstituted or may be substituted with one or more of the aforementioned substituent groups L.

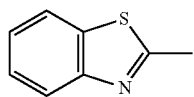
(W-7-7-1)

In formulae (T$^{1-1}$) or (T$^{1-2}$) the parameter W$^{T2}$ denotes preferably, a hydrogen atom, a linear or branched alkyl group having 1 to 20 carbon atoms, in which any hydrogen atom in the group may be substituted with F and one —CH$_2$— or two or more non-adjacent —CH$_2$— may be each independently substituted with —O—, —CO—, —COO—, —OCO—, —O—CO—O—, —CH=CH—COO—, —CH=CH—OCO—, —COO—CH=CH—, —OCO—CH=CH—, —CH=CH—, —CF=CF—, or —C≡C—, or a group represented by P-Sp-, more preferably, a hydrogen atom or a linear or branched alkyl group having 1 to 20 carbon atoms, in which any hydrogen atom in the group may be substituted with F and one —CH$_2$— or two or more non-adjacent —CH$_2$— may be each independently substituted with —O—, —CO—, —COO—, or —OCO—, or a group represented by P-Sp-, even more preferably, a hydrogen atom or a linear alkyl group having 1 to 12 carbon atoms, in which one —CH$_2$— or two or more non-adjacent —CH$_2$— may be each independently substituted with —O—, or a group represented by P-Sp-. Further, when W$^{T2}$ denotes a group having 2 to 30 carbon atoms, having at least one aromatic group which may be unsubstituted or may be substituted with one or more of the aforementioned substituent groups L, in particular, a group selected from formulae (W-1) to (W-18), each of which may be unsubstituted or may be substituted with one or more of the aforementioned substituent groups L. In this case, the more preferable structure thereof is the same as above.

Preferred combinations of G$^{T1}$, T$^{1-1}$ or T$^{1-2}$ and W$^{T1}$ are given in formulae (G-11) to (G-22) below:

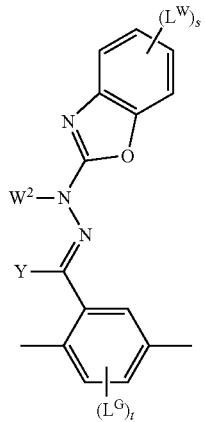
(G-12)

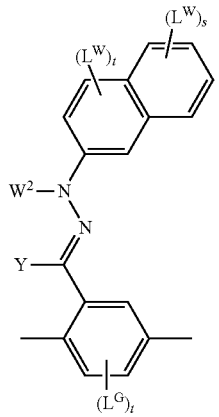
(G-13)

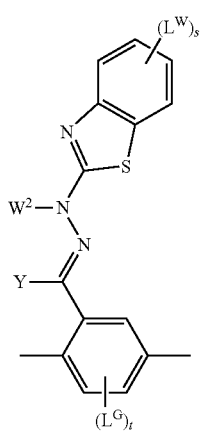
(G-11)

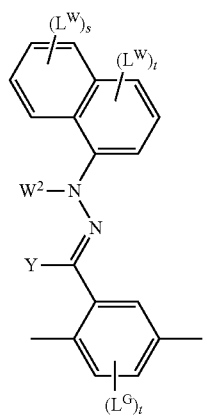
(G-14)

(G-15)
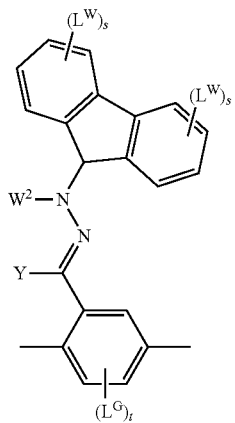
(G-16)
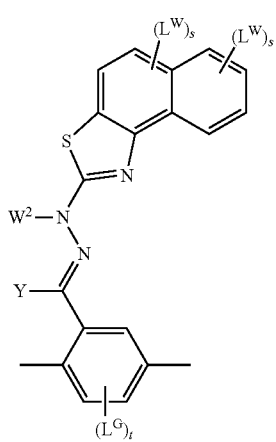
(G-17)
(G-18)
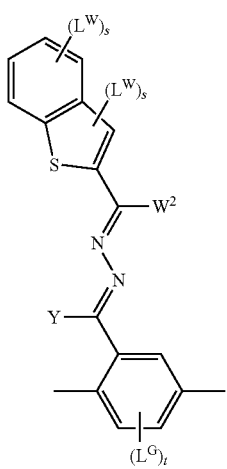
(G-19)
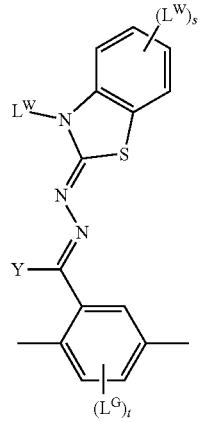
(G-20)
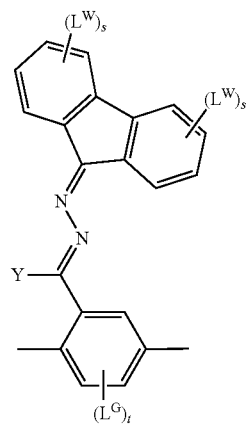
(G-21)
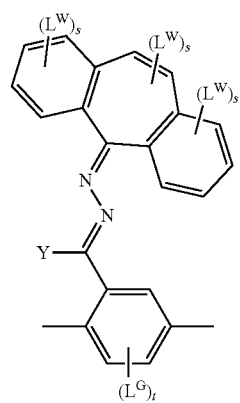

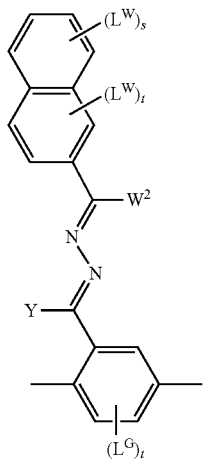
(G-22)

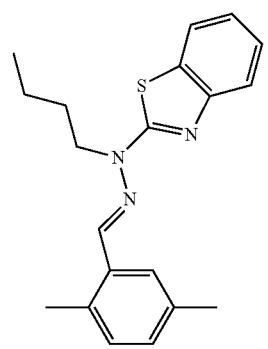
(G-11-3)

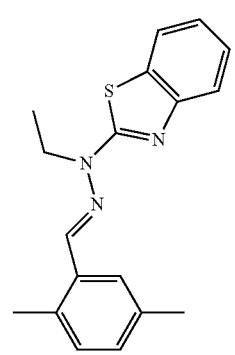
(G-11-4)

wherein, $L^G$, $L^w$, have each and independently in each occurrence one of the meanings as given above for L, Y, and $W^{T2}$ represent the same meanings as those described above, r denotes an integer of 0 to 5, s denotes an integer of 0 to 4, t denotes an integer of 0 to 3, u denotes an integer of 0 to 2, and v denotes 0 or 1. Further, these groups may be configured such that right and left thereof are reversed).

Further, in formulae (G-11) to (G-22), Y denotes more preferably a hydrogen atom, each of s, t, u, and v is further preferably 0, and a group selected from formulae (G-11-1) to (G-20-1) below is particularly preferable.

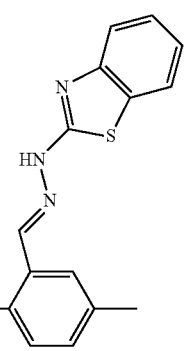
(G-11-1)

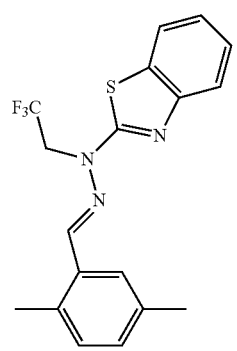
(G-11-5)

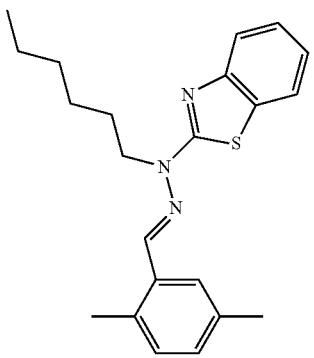
(G-11-2)

(G-11-6)

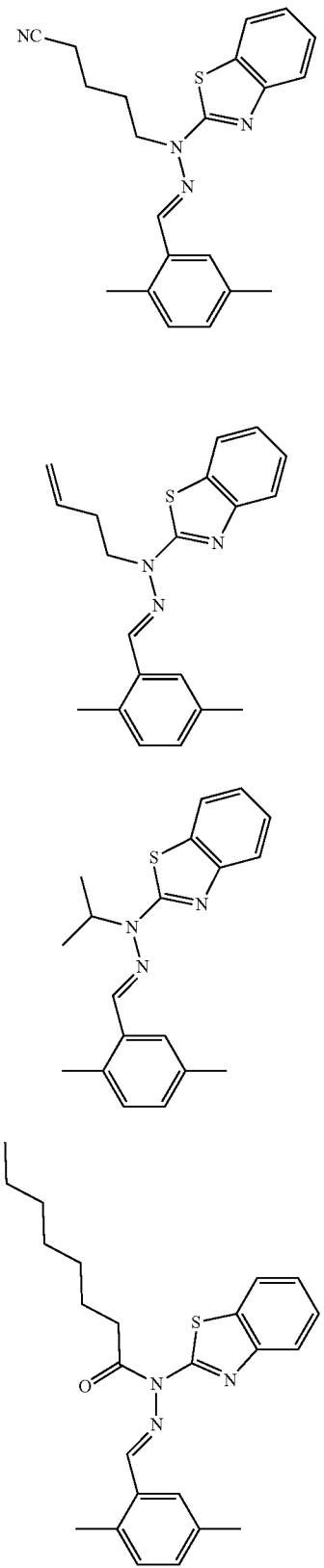
(G-11-7)
(G-11-8)
(G-11-9)
(G-11-10)
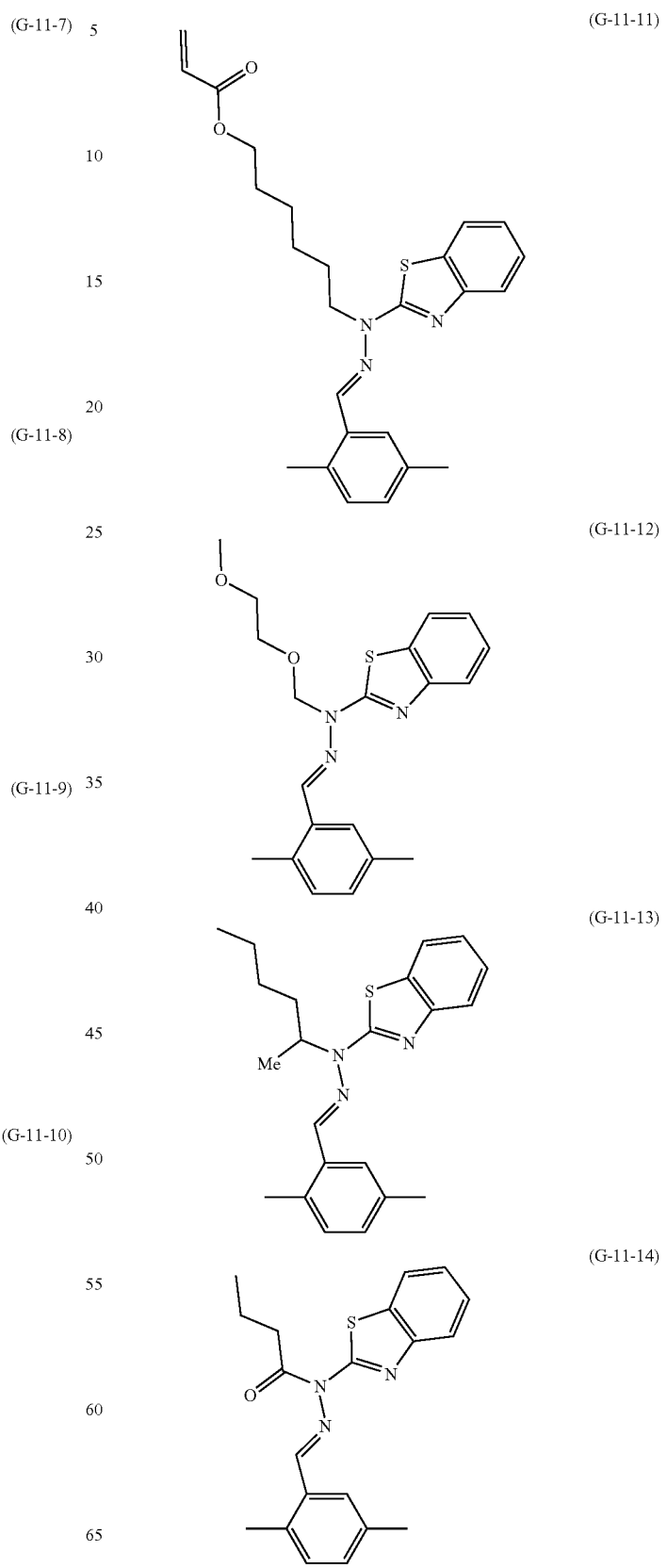
(G-11-11)
(G-11-12)
(G-11-13)
(G-11-14)

(G-11-15)
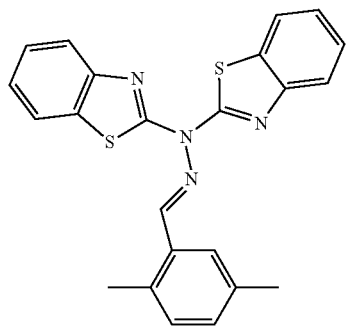
(G-11-16)
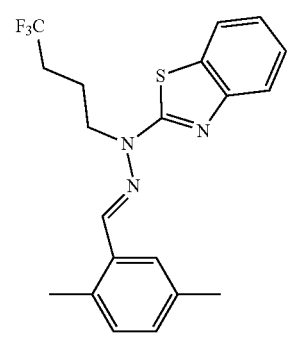
(G-11-17)
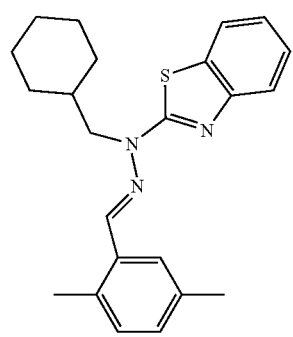
(G-11-18)
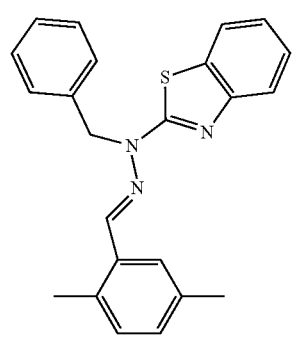
(G-11-19)
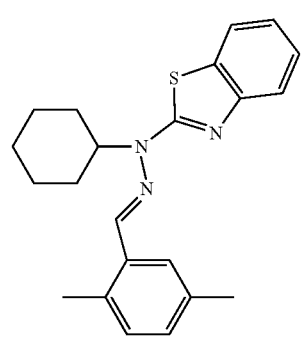
(G-11-20)
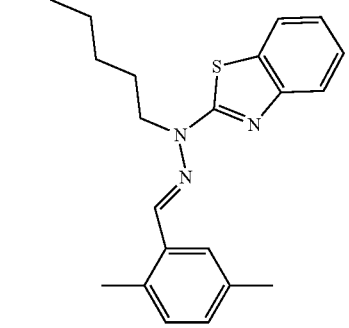
(G-11-21)
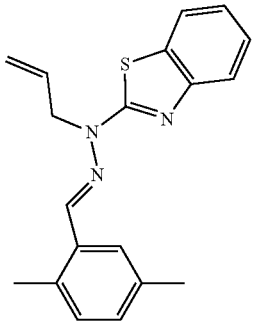
(G-11-22)
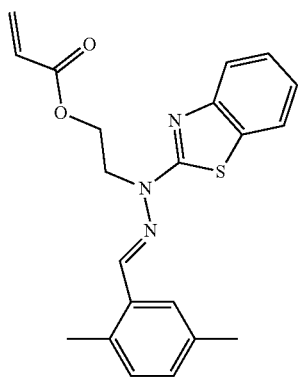
(G-11-23)
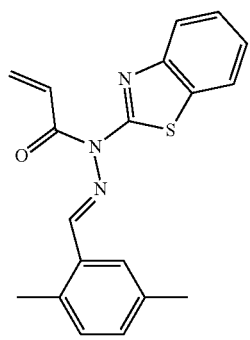

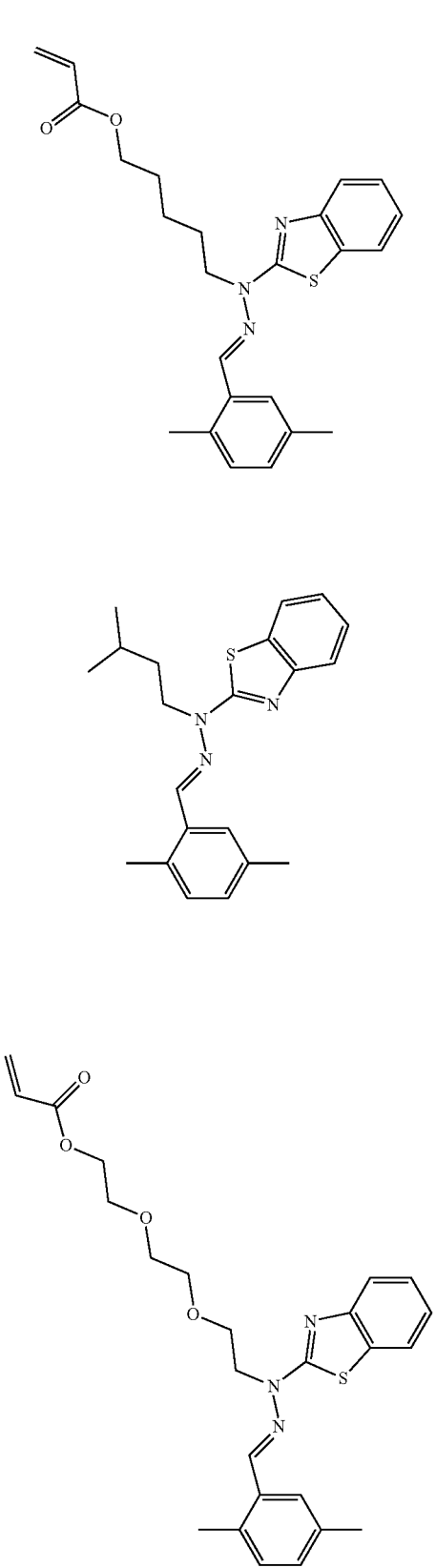
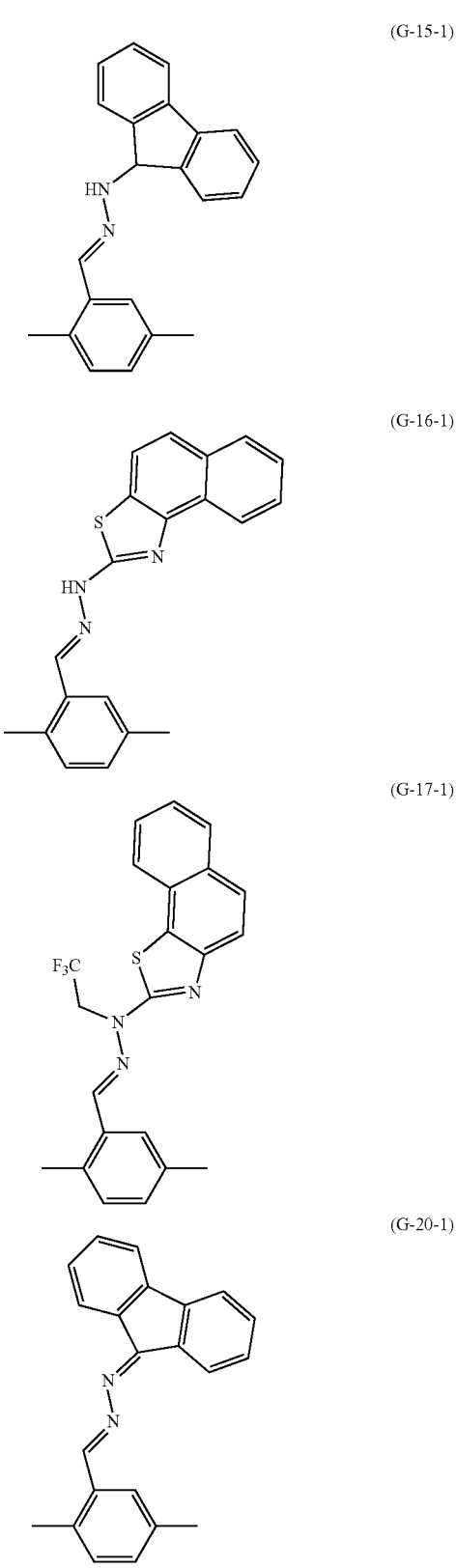

Preferred compounds of represented by formula T are preferably selected from the group of compounds of formula (TA-1) to (TA-3)

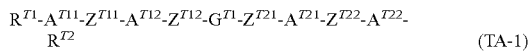  (TA-1)

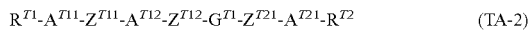  (TA-2)

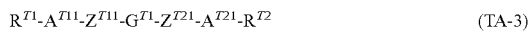  (TA-3)

wherein,
$R^{T1}$, $R^{T2}$, and $G^{T1}$ have the same meanings as those in formula T,
$A^{T11}$ to $A^{T22}$ have the same meanings as $A^{T1}$ and $A^{T2}$ in formula T,
$Z^{T11}$ to $Z^{T22}$ have the same meanings as $Z^{T1}$ and $Z^{T2}$ in formula T,
Preferable forms of each of the groups $R^{T1}$, $R^{T2}$, $G^{T1}$, $A^{T11}$ to $A^{T22}$ and $Z^{T11}$ to $Z^{T22}$ in formulae (TA-1) to (TA-3) are the same as those for formula T.

Specific examples and especially preferred compounds of formula T are disclosed e.g. in US 2015175564, WO 17079867 A1, WO16104317 A, US 2015277007 A1, or WO 16171041 A1 and in particular include compounds represented by formulae 1 to 5 of US 2015175564 A1, compounds represented by formulae (I-1) to (I-5), (I-8), (I-14), (I-16) to (I-36), (I-41), (I-54) to (I-65), (I-75) to (I-80), (I-82), (I-83), (I-86) to (I-97) and (I-121) to (I-125) of WO 17/079867 A1, compounds represented by formulae (A12-16) to (A12-18), (A14-1) to (A14-3) and (A141-1) to (A143-2) of WO 16104317 A1, compounds represented by formulae (2-A) to (2-D), (3-A) to (3-D), (4-A) to (4-D), (5-A) to (5-D), (7-A) to (7-D), (8-A) to (8-D), (9-A) to (9-D), (11-B) to (11-D), (12-b) to (12-D), (13-B) to (13-D), (22-B) to (22-D), (25-B) to (25-D), (40-A) to (40-D), (41-A) to (41-D), (42-A) to (42-D), (43-A) to (43-D), (44-A) to (44-D), (50-A) to (50-D), (52-A) to (52-D), (54-A) to (54-D), (55-A) to (55-D), or (56-A) to (56-D) of US 2015/0277007 A1, compounds represented by formulae (A) to (E) of WO 16171041 A1, or the compound of formula T-1 tgart. Preferably they are prepared in analogy or in accordance to the disclosure given in WO 17/079867 A1.

The proportion of compounds of formula T in a polymerisable liquid-crystalline material according to the present invention as a whole, is preferably in the range from 10 to 99.9% by weight, more preferably in the range from 20 to 80% by weight and even more preferably in the range from 30 to 60% by weight.

It is a matter of routine for the skilled person to determine the correct amount of formula T utilized in a polymerizable LC material in accordance with the present invention in order to obtain polymer films exhibiting flat, positive or negative dispersion.

In general, the higher the amount of compounds of formula T in a polymerizable LC material in accordance with the present invention, the more decreased is the optical dispersion eg. from positive to flat to negative dispersion.

Preferably, the polymerizable LC medium comprises one or more di- or multireactive mesogenic compound selected from the group of compounds of formula DRM $P^1$-$Sp^1$-MG-$Sp^2$-$P^2$  DRM wherein
$P^1$ and $P^2$ independently of each other denote a polymerisable group (P),
$Sp^1$ and $Sp^2$ independently of each other are a spacer group (Sp) or a single bond, and
MG is a rod-shaped mesogenic group, which is preferably selected of formula MG

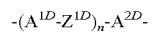  MG wherein
$A^{1D}$ and $A^{2D}$ denote, in case of multiple occurrence independently of one another, an aromatic or alicyclic group, which optionally contains one or more heteroatoms selected from N, O and S, and is optionally mono- or polysubstituted by $L^1$,
L has each and independently one of the meanings as given above in formula T,

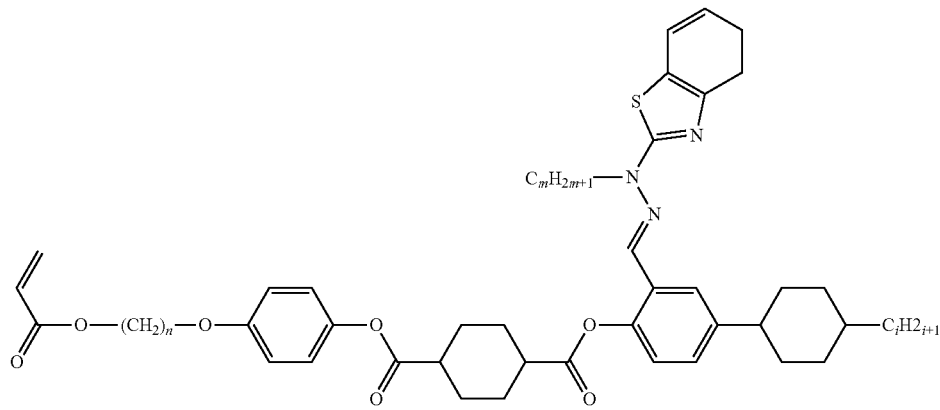

T-1 wherein m, n, and i denotes each and independently an integer between 1 and 8.

The compounds of the formulae (T), (TA-1) to (TA-3) and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stut- $R^{oo}$ and $R^{ooo}$ independently of each other denote H or alkyl with 1 to 12 C-atoms,
$Z^{1D}$ denotes, in case of multiple occurrence independently of one another, —O—, —S—, —CO—, —COO—, —OCO—, —S—CO—, —CO—S—, —O—COO—, —CO—NR$^{oo}$—, —NR$^{oo}$—CO—, —NR$^{oo}$—CO—NR$^{ooo}$, —NR$^{oo}$—CO—O—, —O—CO—NR$^{oo}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, Y$^1$ and Y$^2$ independently of each other denote H, F, Cl or CN, n is 1, 2, 3 or 4, preferably 1 or 2, most preferably 2, n1 is an integer from 1 to 10, preferably 1, 2, 3 or 4, whereby the compounds of formula T are excluded.

Preferred groups A$^{1D}$ and A$^{2D}$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups A$^{1D}$ and A$^{2D}$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by 0 and/or S, wherein these groups are unsubstituted or substituted by 1, 2, 3 or 4 groups L as defined above.

Particular preferred groups Z$^{1D}$ are in each occurrence independently from another preferably selected from —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, Very preferred multi or direactive mesogenic compounds of formula DRM are selected from the following formulae:

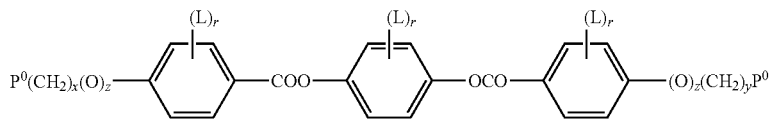

DRMa1

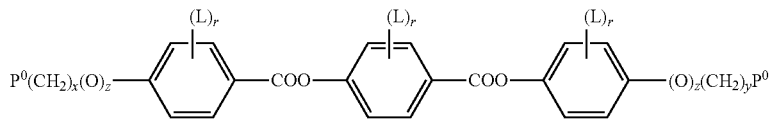

DRMa2

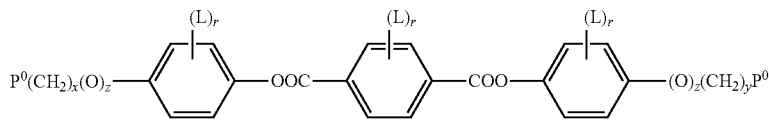

DRMa3

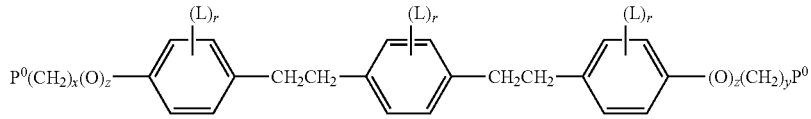

DRMa4

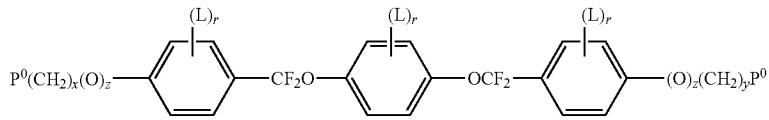

DRMa5

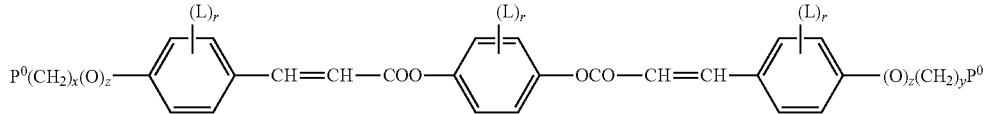

DRMa6

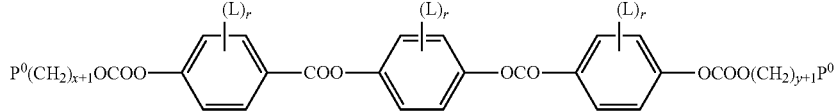

DRMa7

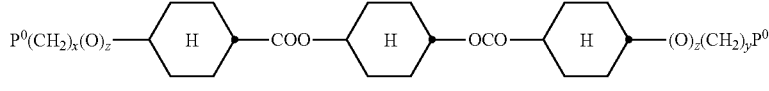

DRMb

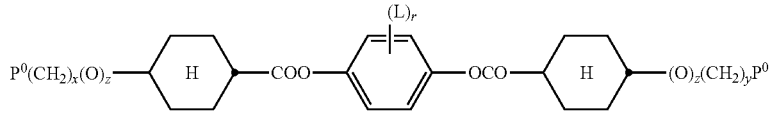

DRMc

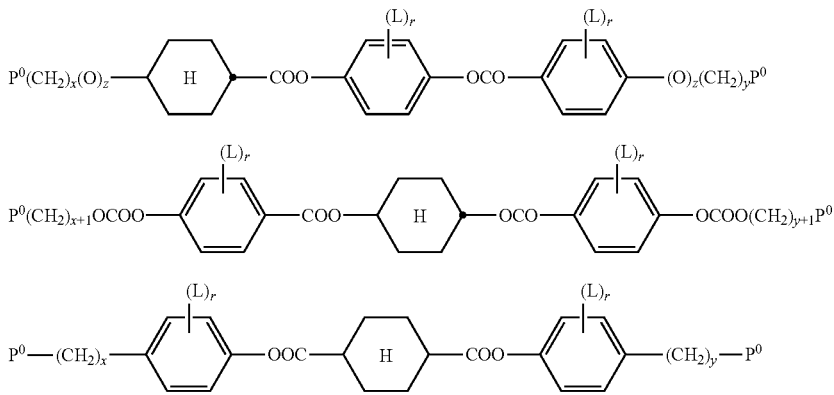

wherein
- P⁰ is, in case of multiple occurrence independently of one another, a polymerisable group (P), preferably an acryl, methacryl, oxetane, epoxy, vinyl, heptadiene, vinyloxy, propenyl ether or styrene group,
- L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
- r is 0, 1, 2, 3 or 4,
- x and y are independently of each other 0 or identical or different integers from 1 to 12,
- z is each and independently, 0 or 1, with z being 0 if the adjacent x or y is 0.

Especially preferred are compounds of formula DRMa1, DRMa2, DRMa3, DRMa7, and DRMf in particular those of formula DRMa1, DRMa7, and DRMf.

Preferably, the polymerisable LC material additionally comprises at least one monoreactive mesogenic compound, which is preferably selected from formula MRM, $$P^1\text{-}Sp^1\text{-}MG\text{-}R \qquad \text{MRM}$$

wherein $P^1$, $Sp^1$ and MG have one of the meanings given above in formula DRM,
- R F, Cl, Br, I, —CN, —NO₂, —NCO, —NCS, —OCN, —SCN, —C(=O)NRˣRʸ, —C(=O)X, —C(=O)ORˣ, —C(=O)Rʸ, —NRˣRʸ, —OH, —SF⁵, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl,
- X is halogen, preferably F or Cl, and
- Rˣ and Rʸ are independently of each other H or alkyl with 1 to 12 C-atoms.

Preferably, the monoreactive mesogenic compounds of formula MRM are selected from the following formulae.

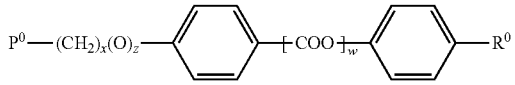
MRM1

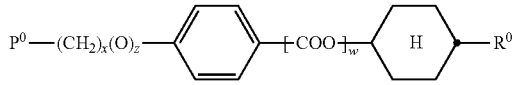
MRM2

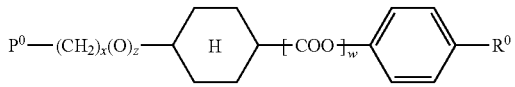
MRM3

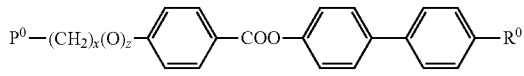
MRM4

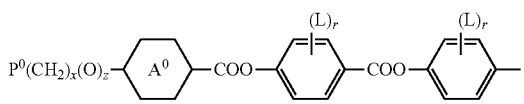
MRM5

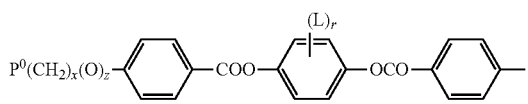
MRM6

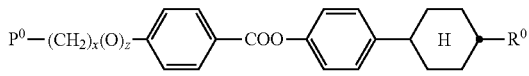
MRM7

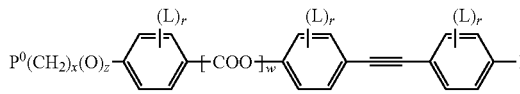
MRM8

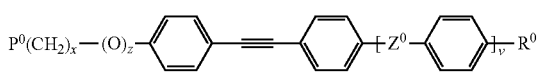
MRM9

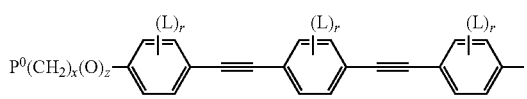
MRM10

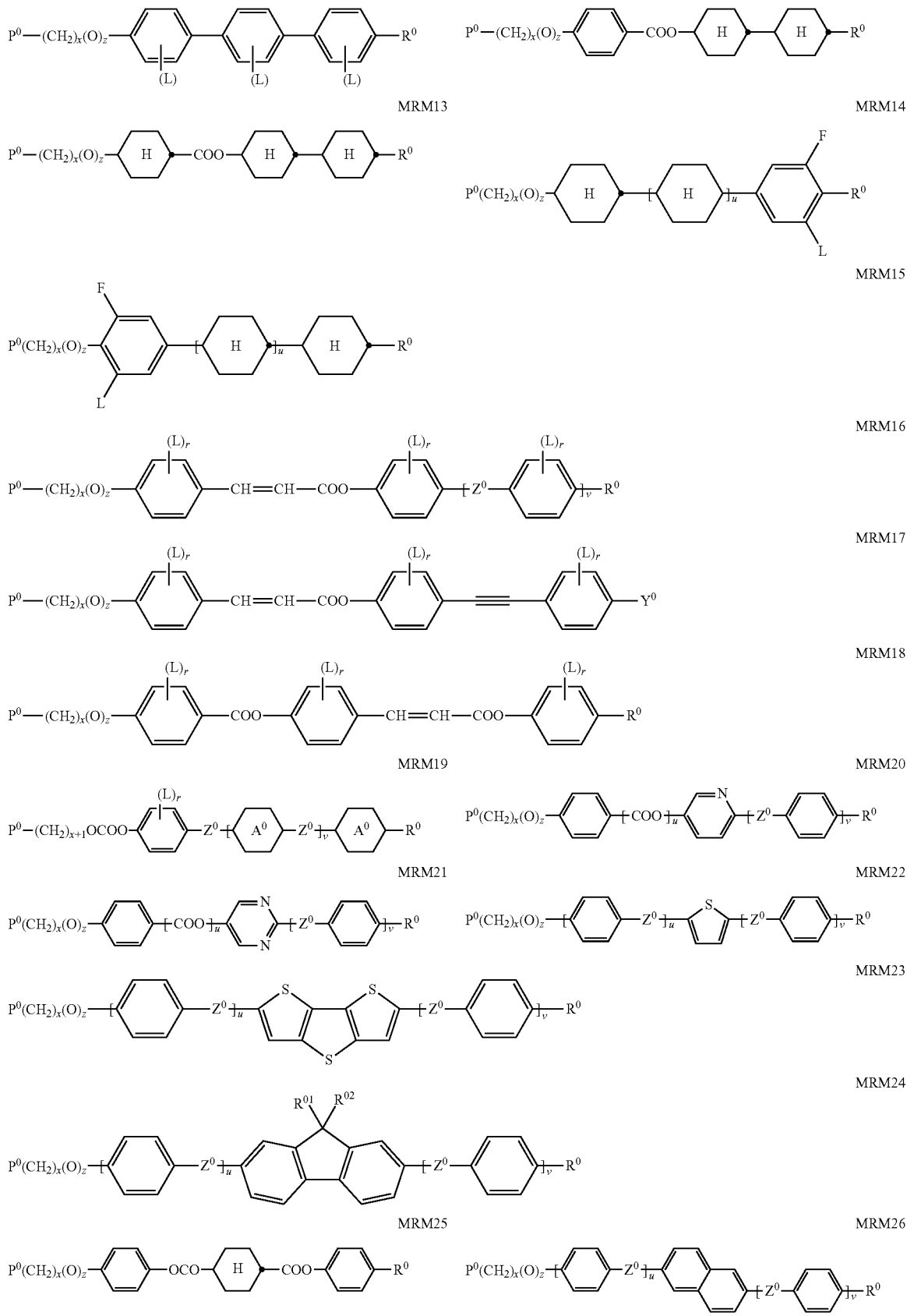

MRM27

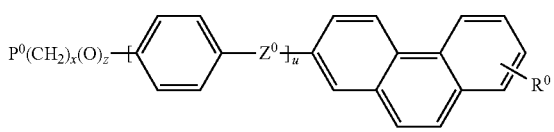

wherein P⁰, L, r, x, y and z are as defined in formula DRMa-1 to formula DRMe,
R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y⁰,
Y⁰ is F, Cl, CN, $NO_2$, $OCH_3$, OCN, SCN, $SF_5$, or mono- oligo- or polyfluorinated alkyl or alkoxy with 1 to 4 C atoms,
Z⁰ is —COO—, —OCO—, —$CH_2CH_2$—, —$CF_2O$—, —$OCF_2$—, —CH=CH—, —OCO—CH=CH—, —CH=CH—COO—, or a single bond,
A⁰ is, in case of multiple occurrence independently of one another, 1,4-phenylene that is unsubstituted or substituted with 1, 2, 3 or 4 groups L, or trans-1,4-cyclohexylene,
u and v are independently of each other 0, 1 or 2,
w is 0 or 1,
and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, especially those of formula MRM1, MRM4, MRM6, and MRM7, and in particular those of formulae MRM1 and MRM7.

The compounds of the formulae DRM, MRM, and subformulae thereof can be pre-pared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The proportion of said mono-, di- or multireactive liquid-crystalline compounds in a polymerisable liquid-crystalline material according to the present invention as a whole, is preferably in the range from 30 to 99% by weight, more preferably in the range from 40 to 99% by weight and even more preferably in the range from 50 to 99% by weight.

In a preferred embodiment, the proportion of the di- or multireactive polymerisable mesogenic compounds in a polymerisable liquid-crystalline material according to the present invention as a whole, is preferably in the range from 5 to 99% by weight, more preferably in the range from 10 to 97% by weight and even more preferably in the range from 15 to 95% by weight.

In another preferred embodiment, the proportion of the monoreactive polymerisable mesogenic compounds in a polymerisable liquid-crystalline material according to the present invention as a whole, is, if present, preferably in the range from 5 to 80% by weight, more preferably in the range from 10 to 75% by weight and even more preferably in the range from 15 to 70% by weight.

In another preferred embodiment, the proportion of the multireactive polymerizable mesogenic compounds in a polymerisable liquid-crystalline material according to the present invention as a whole is, if present, preferably in the range from 1 to 30% by weight, more preferably in the range from 2 to 20% by weight and even more preferably in the range from 3 to 10% by weight.

In another preferred embodiment the polymerisable LC material does not contain polymerizable mesogenic compounds having more than two polymerisable groups.

In another preferred embodiment the polymerisable LC material does not contain polymerizable mesogenic compounds having less than two polymerisable groups.

In another preferred embodiment the polymerisable LC material is an achiral material, i.e. it does not contain any chiral polymerizable mesogenic compounds or other chiral compounds.

In a further preferred embodiment, the polymerisable LC material comprises at least one monoreactive mesogenic compound, preferably selected from formulae MRM-1, at least one direactive mesogenic compound, preferably selected from formula DRMa-1, and at least one compound of formulae CO-1 and T, respectively.

In a further preferred embodiment, the polymerisable LC material comprises at least one monoreactive mesogenic compound, preferably selected from formula MRM-7, at least one direactive mesogenic compound, preferably selected from formula DRMa-7 and/or DRMf, and at least one compound of formulae CO-1 and T, respectively.

In a further preferred embodiment, the polymerisable LC material comprises at least two monoreactive mesogenic compound, preferably selected from compounds of formulae MRM-1 and/or MRM-7, at least one direactive mesogenic compound, preferably selected from formula DRMa-7 and/or DRMf, and at least one compound of formulae CO-1 and T, respectively.

In a further preferred embodiment, the polymerisable LC material comprises at least two monoreactive mesogenic compounds, preferably selected from compounds of formulae MRM-1 and/or MRM-7, at least two direactive mesogenic compounds, preferably selected from compounds of formula DRMa-7 and/or DRMf, and at least one compound of formulae CO-1 and T, respectively.

In a further preferred embodiment, the polymerisable LC material comprises at least two direactive mesogenic compounds, preferably selected from compounds of formula DRMa-7 and/or DRMf, and at least one compound of formulae CO-1 and T, respectively.

In a further preferred embodiment the polymerisable LC material optionally comprises one or more additives selected from the group consisting of further polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerisable LC material optionally comprises one or more additives selected from polymerisable non-mesogenic compounds (reactive thinners). The amount of these additives in the polymerisable LC material is preferably from 0 to 30%, very preferably from 0 to 25%.

The reactive thinners used are not only substances which are referred to in the actual sense as reactive thinners, but also auxiliary compounds already mentioned above which contain one or more complementary reactive units or polymerizable groups P, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propyleneglycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

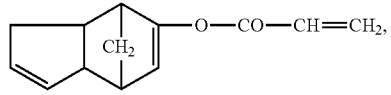

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYKO-022, BYK®-023, BYK®-024, BYK®-025, BYK®-027, BYK®-031, BYKO-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYKO-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain (fluorinated)alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361N, BYK®388.

Such-auxiliaries are also available, for example, from 3M as FC4430®.

Such-auxiliaries are also available, for example, from Cytonix as FluorN®561 or FluorN®562.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYKO-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC materials according to the invention, their proportion optionally corresponds to from about 0 to 5.0% by weight, based on the total weight of the polymerisable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of light, heat and/or oxidation stabilizers are the following:
  alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5- di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyil)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo[2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl) hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenyamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300;

sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tertbutylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl) sebacate, bis(1-octyloxy-2,2,6,6-tetramethylpiperidin-4-yl)succinate, the condensation product of N,N'-bis(2,2,6,6-tetramethylpiperidin-4-yl) hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino) ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, paramethoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment the polymerisable LC material comprises one or more specific antioxidant additives, preferably selected from the Irganox® series, e.g. the commercially available antioxidants Irganox®1076 and Irganox®1010, from Ciba, Switzerland.

In another preferred embodiment, the polymerisable LC material comprises a combination of one or more, more preferably of two or more photoinitiators. Typically, additional radical photoinitiators which can be utilized together with one or more compounds of formula CO-1, are, for example, selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO.

The concentration of the polymerisation initiator(s) as a whole in the polymerisable LC material is preferably from 1 to 10%, very preferably from 2 to 8%, more preferably 3 to 6%.

Preferably, the polymerisable LC material comprises besides one or more compounds of formula CO-1 and one or more compounds of formula T,
  a) one or more di- or multireactive polymerisable mesogenic compounds,
  b) optionally one or more monoreactive polymerisable mesogenic compounds,
  c) optionally one or more antioxidative additives,
  d) optionally one or more adhesion promotors,
  e) optionally one or more surfactants,
  f) optionally one or more stabilizers,
  g) optionally one or more mono-, di- or multireactive polymerisable non-mesogenic compounds,
  h) optionally one or more dyes showing an absorption maximum at the wavelength used to initiate photo polymerisation,
  i) optionally one or more chain transfer agents, j) optionally one or more stabilizers,
k) optionally one or more lubricants and flow auxiliaries, and
l) optionally one or more diluents,
m) optionally a non-polymerisable nematic component.

More preferably, the polymerisable LC material comprises besides one or more compounds of formula T,
a) one or more photoinitiators of formula CO-1, preferably selected from compounds of formulae CO-19 to CO-22, more preferably a compound of formula CO-19, preferably in an amount of 1 to 10% by weight, very preferably 2 to 8% by weight,
b) one or more, preferably two or more, direactive polymerisable mesogenic compounds, preferably in an amount, if present at all, of to 90% by weight, very preferably 15 to 75% by weight, preferably selected from the compounds of formula DRMa-1,
c) optionally one or more, preferably two or more, monoreactive polymerisable mesogenic compounds, preferably in an amount of to 95% by weight, very preferably 25 to 85%, preferably selected from compounds of formulae MRM-1 and/or MRM-7,
d) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
e) optionally one or more lubricants and flow auxiliaries, preferably selected from BYK®388, FC 4430 and/or Fluor N 562, and if present, preferably in an amount of 0.1 to 5% by weight, very preferably 0.2 to 3% by weight, and
f) optionally one or more diluents, preferably selected from n-dodecanol, if present, preferably in an amount of 0.1 to 5% by weight, very preferably 0.2 to 3% by weight, and The invention further relates to a method of preparing a polymer film by
providing a layer of a polymerisable LC material as described above and below onto a substrate,
polymerising the polymerisable components of the polymerisable LC material by photopolymerisation, and
optionally removing the polymerised LC material from the substrate and/or optionally providing it onto another substrate.

It is also possible to dissolve the polymerisable LC material in a suitable solvent.

In another preferred embodiment, the polymerisable LC material comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerisable LC material contains one or more solvents, the total concentration of all solids, including the RMs, in the solvent(s) is preferably from 10 to 60%.

This solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

The polymerisable LC material preferably exhibits a uniform alignment throughout the whole layer. Preferably the polymerisable LC material exhibits a uniform planar or a uniform homeotropic alignment.

The Friedel-Creagh-Kmetz rule can be used to predict whether a mixture will adopt planar or homeotropic alignment, by comparing the surface energies of the RM layer and the substrate:

If $\gamma_{RM} > \gamma_s$ the reactive mesogenic compounds will display homeotropic alignment, If $\gamma_{RM} < \gamma_s$ the reactive mesogenic compounds will display homeotropic alignment.

When the surface energy of a substrate is relatively low, the intermolecular forces between the reactive mesogens are stronger than the forces across the RM-substrate interface. Therefore, reactive mesogens align perpendicular to the substrate (homeotropic alignment) in order to maximise the intermolecular forces.

Homeotropic alignment can also be achieved by using amphiphilic materials; they can be added directly to the polymerisable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth.

Other suitable planar alignment layers are known in the art, like for example rubbed polyimide or alignment layers prepared by photoalignment as described in U.S. Pat. No. 5,602,661, 5,389,698 or 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. Further review of alignment materials and techniques is given by J. Cognard, Mol. Cryst. Liq. Cryst. 78, Supplement 1 (1981), pages 1-77.

For the production of the polymer films according to the invention, the polymerisable compounds in the polymerisable LC material are polymerised or crosslinked (if one compound contains two or more polymerisable groups) by in-situ photopolymerisation.

The photopolymerisation can be carried out in one step. It is also possible to photopolymerise or crosslink the compounds in a second step, which have not reacted in the first step ("end curing").

In a preferred method of preparation the polymerisable LC material is coated onto a substrate and subsequently photopolymerised for example by exposure to actinic radiation as described for example in WO 01/20394, GB 2,315,072 or WO 98/04651.

Photopolymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably 5 minutes, very preferably 3 minutes, most preferably 1 minute. For mass production, short curing times of 30 seconds are preferred.

A suitable UV radiation power is preferably in the range from 5 to 200 mWcm-2, more preferably in the range from 50 to 175 mWcm$^{-2}$ and most preferably in the range from 100 to 150 mWcm$^{-2}$.

In connection with the applied UV radiation and as Function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Photopolymerisation is preferably performed under an inert gas atmosphere, preferably in a heated nitrogen atmosphere, but also polymerisation in air is possible.

Photopolymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 µm, in particular not greater than 0.5 µm, very preferably not greater than 0.2 µm.

For example, uniformly homeotropic or planar aligned polymer films of the present invention can be used as retardation or compensation films for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 µm, very preferably from 0.5 to 5 µm, in particular from 0.5 to 3 µm.

The optical retardation ($\delta(\lambda)$) of a polymer film as Function of the wavelength of the incident beam ($\lambda$) is given by the following equation (7):

$$\delta(\lambda)=(2\pi\Delta n \cdot d)/\lambda \quad (7)$$

wherein ($\Delta n$) is the birefringence of the film, (d) is the thickness of the film and $\lambda$ is the wavelength of the incident beam.

According to Snellius law, the birefringence as Function of the direction of the incident beam is defined as $$\Delta n = \sin \Theta / \sin \Psi \quad (8)$$

wherein sin $\Theta$ is the incidence angle or the tilt angle of the optical axis in the film and sin $\Psi$ is the corresponding reflection angle.

Based on these laws, the birefringence and accordingly optical retardation depends on the thickness of Film and the tilt angle of optical axis in the film (cf. Berek compensator). Therefore, the skilled expert is aware that different optical retardations or different birefringence can be induced by adjusting the orientation of the liquid-crystalline molecules in the polymer film.

The birefringence ($\Delta n$) of the polymer film according to the present invention is preferably in the range from 0.01 to 0.30, more preferable in the range from 0.01 to 0.25 and even more preferable in the range from 0.01 to 0.16.

The optical retardation as Function of the thickness of the polymer film according to the present invention is less than 200 nm, preferable less than 180 nm and even more preferable less than 150 nm.

Depending on the utilized amounts of the compounds of formula T, the polymer film according to the present invention exhibits negative or reverse dispersion with R (450)/R (550)<1 or |R (450)|<|R (550)|. In another preferred embodiment and depending on the utilized amounts of the compounds of formula T, the polymer film according to the present invention exhibits positive or normal dispersion has R (450)/R (550)>1 or |R (450)|>|R (550)|. However, it is likewise preferred that the polymer film according to the present invention exhibits flat dispersion with R (450)/R (550)≈1 or |R (450)|≈|R (550)|.

Especially with regard to the incell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable LC material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

Examples

The invention will now be described in more detail by reference to the following working examples, which are illustrative only and do not limit the scope of the invention.

Utilized Photoinitiators

| Compound | Tradename |
|---|---|
| [structure] | SPI-02 |
| [structure] | SPI-3 |
| [structure] | SPI-4 |
| 2-Methyl-4'-(methylthio)-2-morpholinopropiophenone | Irgacure 907 |
| Diphenyl(2,4,6-trimethylbenzoyl)phosphine oxide | Darocure TPO |

SPI-02, SPI-03 and SPI-04 are commercially available from Samyang, Korea. Irgacure 907 and Darocure TPO are commercially available from Ciba, Switzerland.

Utilized Mixtures

Mixed M1 in an oven at 85° C. for a total time of 96 h. After 96 h, the film is taken out of the oven and cooled to room temperature before recording the retardation profile again. The durability is quantified by the difference in $R_{th}$ before and after the oven test.

| Compound | Amount %-w/w |
|---|---|
| FluorN 561 | 0.42 |
| Irganox 1076 | 0.12 |
|  | 25.82 |
| 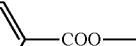 | 16.56 |
|  | 16.08 |
| | 40.00 |
|  | |

Experiment 1.1

Base mixture M1 is mixed with 1% SPI-02 (commercially available from Samyang, Korea) and dissolved in to 33.3% solids in toluene.

The solution is spin coated at 2500 rpm for 30 seconds at 20° C. on a raw glass substrate which is coated with rubbed PI. The film is annealed at 68° C. for 60 seconds and cooled down to 20° C. under an $N_2$-atmosphere cured under a N2 atmosphere using a static fusion UV system (80 mW for 60 seconds).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed Table 1.1 summarizes the result of the durability test (triplicate):

TABLE 1.1

| | R550 (0) | R550 (96) | Average shift in nm R550 (96) | Average % R550 change | STD |
|---|---|---|---|---|---|
| E.1.1 | 186.8 | 156.7 | 28.0 | 15.2 | 0.8 |
| | 184.3 | 156.7 | | | |
| | 180.4 | 154.3 | | | |

Comparative Experiment 1.2

Base mixture M1 is mixed with 1% Irgacure 907 (commercially available from Ciba, Switzerland) and dissolved in to 33.3% solids in toluene. The solution is spin coated at 2500 rpm for 30 seconds at 20° C. on a raw glass substrate which is coated with rubbed PI. The film is annealed at 68° C. for 60 seconds and cooled down to 20° C. under an $N_2$-atmosphere cured under a N2 atmosphere using a static fusion UV system (80 mW for 60 seconds).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 85° C. for a total time of 96 h. After 96 h, the film is taken out of the oven and cooled to room temperature before recording the retardation profile again. The durability is quantified by the difference in $R_{th}$ before and after the oven test.

Table 1.2 summarizes the result of the durability test (triplicate):

TABLE 1.2

| | R550 (0) | R550 (96) | Average shift in nm R550 (96) | Average % R550 change | STD |
|---|---|---|---|---|---|
| CE.1.1 | 190.5 | 142.6 | 44.3 | 23.4 | 1.6 |
| | 188.7 | 144.7 | | | |
| | 187.4 | 146.4 | | | |

Summary 1.3

As can be seen from the comparison of the results of the durability test of experiment 1.1 and comparative experiment 1.2, the polymer film according to the present invention exhibits a significant improvement of the durability.

Experiment 2

Base mixture M1 is mixed with 1% SPI-03 (commercially available from Samyang, Korea) and dissolved in to 33.3% solids in toluene.

The solution is spin coated at 2500 rpm for 30 seconds at 20° C. on a raw glass substrate which is coated with rubbed PI. The film is annealed at 68° C. for 60 seconds and cooled down to 20° C. under an $N_2$-atmosphere cured under a N2 atmosphere using a static fusion UV system (80 mW for 60 seconds).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 85° C. for a total time of 96 h. After 96 h, the film is taken out of the oven and cooled to room temperature before recording the retardation profile again. The durability is quantified by the difference in $R_{th}$ before and after the oven test. The polymer film of experiment 2 exhibits in an improved durability in comparison to comparative experiment 1.2.

Experiment 3

Base mixture M1 is mixed with 1% SPI-04 (commercially available from Samyang, Korea) and dissolved in to 33.3% solids in toluene.

The solution is spin coated at 2500 rpm for 30 seconds at 20° C. on a raw glass substrate which is coated with rubbed PI. The film is annealed at 68° C. for 60 seconds and cooled down to 20° C. under an $N_2$-atmosphere cured under a N2 atmosphere using a static fusion UV system (80 mW for 60 seconds).

The film is laminated to a pressure sensitive adhesive and left with an open surface so the total film stack is glass/polymer film/pressure sensitive adhesive and the film is subjected to the durability experiment.

To measure the retardation ($R_{th}$) of the cured film, Axoscan ellipsometer is used. $R_{th}$ is analysed using a light source with a wavelength of 550 nm. The film is then placed in an oven at 85° C. for a total time of 96 h. After 96 h, the film is taken out of the oven and cooled to room temperature before recording the retardation profile again. The durability is quantified by the difference in $R_{th}$ before and after the oven test. The polymer film of experiment 3 exhibits in an improved durability in comparison to comparative experiment 1.2.

The invention claimed is:

1. A polymerizable LC material comprising:
   (a) one or more compounds of formula T $$R^{T1}-(A^{T1}Z^{T1})_{m1}-G^{T1}-(Z^{T2}-A^{T2})_{m2}-R^{T2} \qquad T$$

wherein $R^{T1}$ and $R^{T2}$ each and independently from another denotes H or an optionally substituted hydrocarbon group having 1 to 20 carbon atoms in which a carbon atom may optionally be replaced with a heteroatom, and at least one of $R^{T1}$ and $R^{T2}$ denotes P-Sp-, P denotes a polymerizable group Sp denotes a spacer group, $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L, L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a $C_{1-20}$-linear or $C_{3-20}$-branched alkyl group, in which one —$CH_2$— or two or more non-adjacent —$CH_2$— may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-, $Z^{T1}$ and $Z^{T2}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—, —N═CH—, —CH=N—N=CH—, —CF=CF—, —C≡C—, a single bond, or a group represented by —CR$^{O1}$R$^{O2}$O— or —OCR$^{O1}$R$^{O2}$— whereby these groups may be unsubstituted or substituted with one or more of the substituent groups L as defined above, T$^1$ denotes a group selected from formulae T$^{1-1}$ and T$^{1-2}$ below,

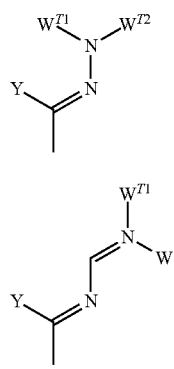

W$^{T1}$ denotes a group containing an aromatic group and/or non-aromatic group having 3 to 40 carbon atoms, which may be substituted, the aromatic group may be a hydrocarbon ring or a heterocyclic ring, and the non-aromatic group may be a hydrocarbon group or a group in which any carbon atom in a hydrocarbon group is substituted with a heteroatom provided that, oxygen atoms are not directly connected with each other, W$^{T2}$ denotes a hydrogen atom or a C$_{1-20}$-linear or C$_{3-20}$-branched alkyl group, in which one —CH$_2$— or two or more non-adjacent —CH$_2$— groups may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or R$^{O1}$ and R$^{O2}$ each independently represent a hydrogen atom, F, Cl, Br, I, or a C$_{1-20}$-linear or C$_{3-20}$-branched alkyl group, in which one —CH$_2$— or two or more non-adjacent —CH$_2$— may be each independently replaced with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be replaced with F or Cl;

G$^{T1}$ denotes a group selected from formulae M-1 to M-8,

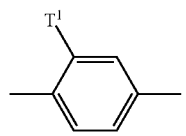

M-1

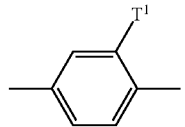

M-2

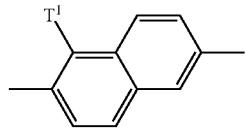

M-3

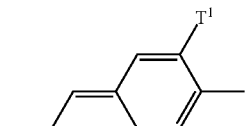

M-4

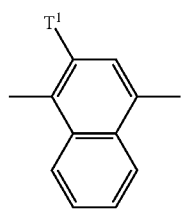

M-5

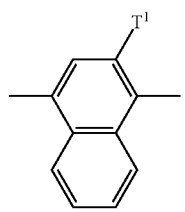

M6

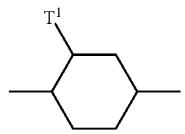

M-7

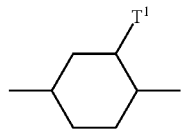

M-8

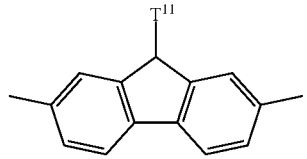

M-9

—C≡C—, and any hydrogen atom in the alkyl group may be replaced with F, or W$^{T2}$ may denote a group of 2 to 30 carbon atoms, or 3-carbon atoms having at least one aromatic group, and the group may be unsubstituted or may be substituted with one or more of substituent groups L as defined above, or W$^{T2}$ may denote a group by P-Sp-, Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a $C_{1-20}$-linear or $C_{3-20}$-branched alkyl group, in which one —CH$_2$— or two or more non-adjacent —CH$_2$— may be each independently replaced with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be replaced with F, or Y may represent a group represented by P-Sp-, m1 and m2 each independently represent an integer of 1 to 6, (b) one or more compounds of formula CO-1,

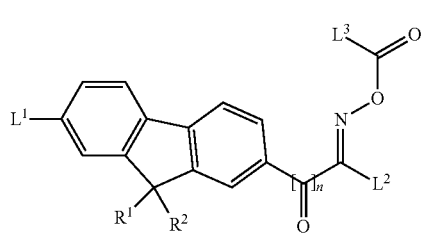

CO-1 wherein
$R^1$ and $R^2$ denotes H, alkyl, alkoxy or mono- oligo- or polyfluorinated alkyl or alkoxy,
$L^1$ denotes H, alkyl, alkoxy, thioalkyl, alkylcarbonyl, alkoxycarbonyl, alkylcarbonyloxy or alkoxycarbonyloxy; halogen, CN, NO$_2$, OCN, SCN, or mono- oligo- or polyfluorinated alkyl or alkoxy atoms; or -(Sp$^{31}$-A$^{31}$),
$L^2$ to $L^3$ denotes H, alkyl, mono- oligo- or polyfluorinated alkyl, or -(Sp$^{31}$-A$^{31}$),
Sp$^{31}$ denotes a spacer group or a single bond, and
A$^{31}$ denotes an aryl, heteroaryl, (non-aromatic) alicyclic and heterocyclic group, optionally having one or more substituents, which are—silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups,
n denotes 0 or 1, (c) one or more compounds of formula DRM,

 DRM wherein
$P^1$ and $P^2$ independently of each other denote a polymerizable group,
Sp$^1$ and Sp$^2$ independently of each other are a spacer group (Sp) or a single bond, and
MG is a rod-shaped mesogenic group,
whereby in DRM the compounds of formula T are excluded, and (d) at least one monoreactive mesogenic compound of formula MRM,

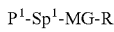 MRM wherein $P^1$, Sp$^1$ and MG have one of the meanings given above in formula DRM,
R is F, Cl, Br, I, —CN, —NO$_2$, —NCO, —NCS, —OCN, —SCN, —C(=O)NR$^x$R$^y$, —C(=O)X, —C(=O)OR$^x$, —C(=O)R$^y$, —NR$^x$R$^y$, —OH, —SF$_5$, optionally substituted silyl, $C_{1-12}$-straight chain alkyl or alkoxy or $C_{3-12}$-branched alkyl or alkoxy, $C_{2-12}$-straight chain or $C_{3-12}$-branched alkylcarbonyl, alkoxycarbonyl, alkylcarbonyloxy or alkoxycarbonyloxy, wherein one or more H atoms are optionally replaced by F or Cl, X is halogen, and
R$^x$ and R$^y$ are independently of each other H or alkyl with 1 to 12 C-atoms.

2. The polymerizable LC material according to claim 1, wherein the compounds of formula CO-1 are compounds of the following formulae

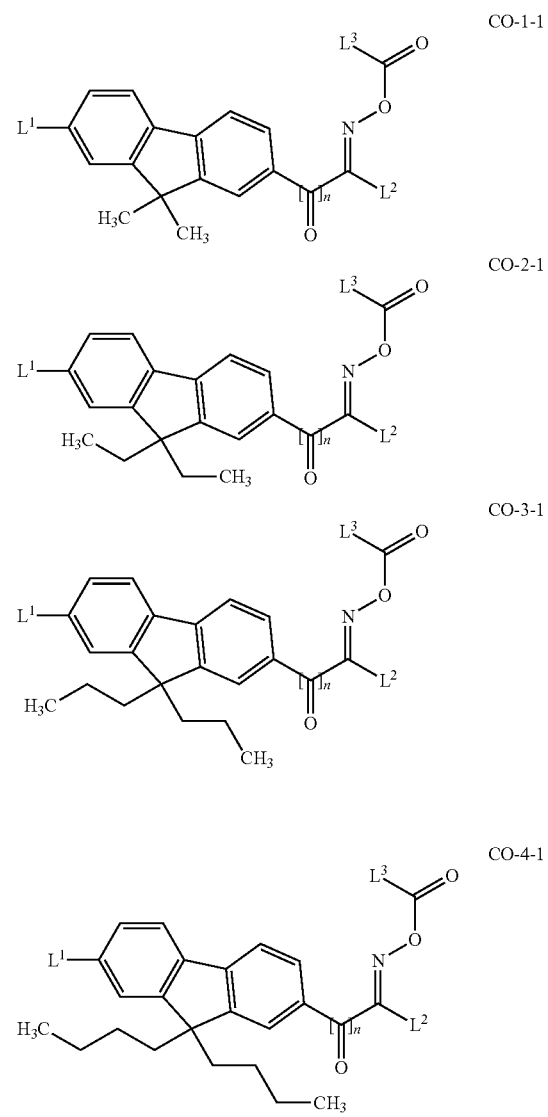

wherein $L^1$ denotes H, Br, CN, or NO$_2$; and
$L^2$, $L^3$ and n have one of the meanings as given in formula CO-1 in claim 1.

3. The polymerizable LC material according to claim 1, wherein A$^{T1}$ and A$^{T2}$ in formula T each independently and in each occurrence denote a group of formulae A-1 to A-11, A-1 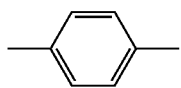

A-2 

A-3 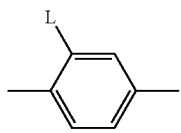

A-4 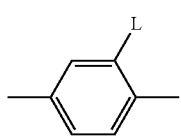

A-5 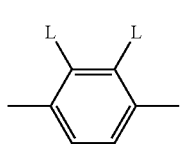

A-6 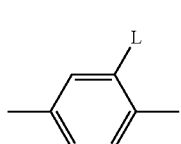

A-7 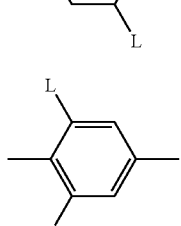

A-8 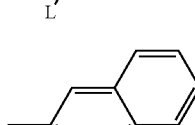

A-9 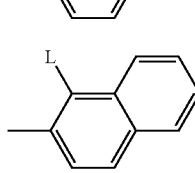

A-10 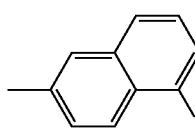

A-11 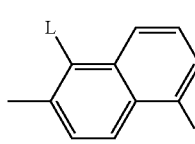

wherein, L has one of the meanings as given above in claim 1.

4. The polymerizable LC material according to claim 1, wherein m1 and m2 in formula T each independently denote an integer of 1 to 3.

5. The polymerizable LC material according to claim 1, wherein $W^{T1}$ in formula T denotes a group selected from formulae (W-1) to (W-18) below each of which may be unsubstituted or substituted with one or more of substituent groups L as given in claim 1, W-1 

W-2 

W-3 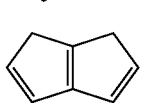

W-4 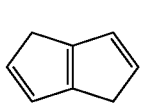

W-5 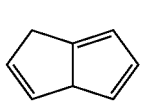

W-6 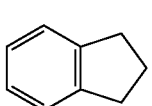

W-7 

W-8 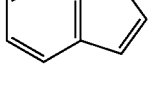

W-9 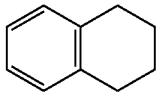

W-10 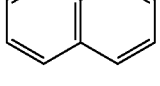

W-11 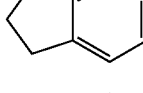

W-12 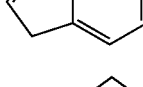

W-13 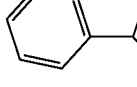

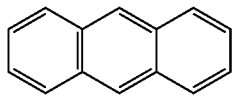 W-14

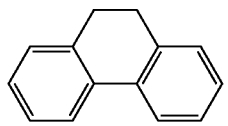 W-15

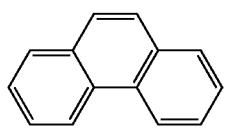 W-16

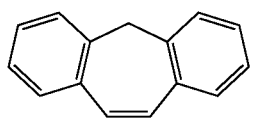 W-17

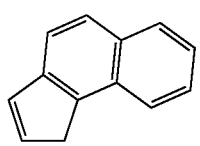 W-18 wherein, the ring structures may have a bond to $T^{1-1}$ or $T^{1-2}$ at any possible position thereof, a group in which two or more aromatic groups selected from these groups are linked by a single bond may be formed, any —CH= may be each independently substituted with —N=, and —CH²— may be each independently substituted with —O—, —S—, —NR$^T$— wherein, R$^T$ denotes a hydrogen atom or an alkyl group having 1 to 20 carbon atoms, —CS—, or —CO—, provided that these groups do not contain a —O—O-bond, and these groups may be unsubstituted or may be substituted with one or more of the substituent groups L as defined in claim 1.

6. The polymerizable LC material according to claim 1, wherein W$^{T1}$ in formula T denotes a group of formulae (W-7-1) to (W-7-8) below each of which may be unsubstituted or may be substituted with one or more of the substituent groups L as defined in claim 1,

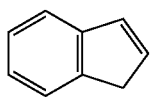 W-7-1

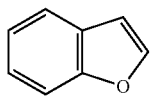 W-7-2

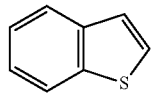 W-7-3

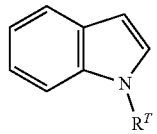 W-7-4

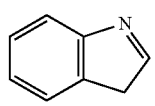 W-7-5

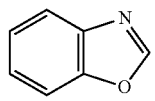 W-7-6

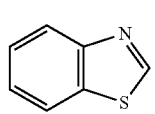 W-7-7

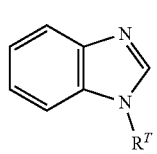 W-7-8 wherein, these groups may have a bond to $T^{1-1}$ or $T^{1-2}$ at any possible position,
and R$^T$ denotes a hydrogen atom or an alkyl group having 1 to 8 carbon atoms.

7. The polymerizable LC material according to claim 1, wherein W$^{T1}$ in formula T denotes a group of formula (W-7-7-1),

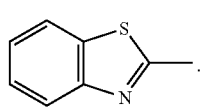 W-7-7-1

8. The polymerizable LC material according to claim 1, wherein the proportion of compounds of formula T in a polymerizable liquid-crystalline material as a whole, is in the range from 10 to 99.9% by weight.

9. The polymerizable LC material according to claim 1, wherein the compound of formula DRM is one or more multi or direactive mesogenic compound of the following formulae,

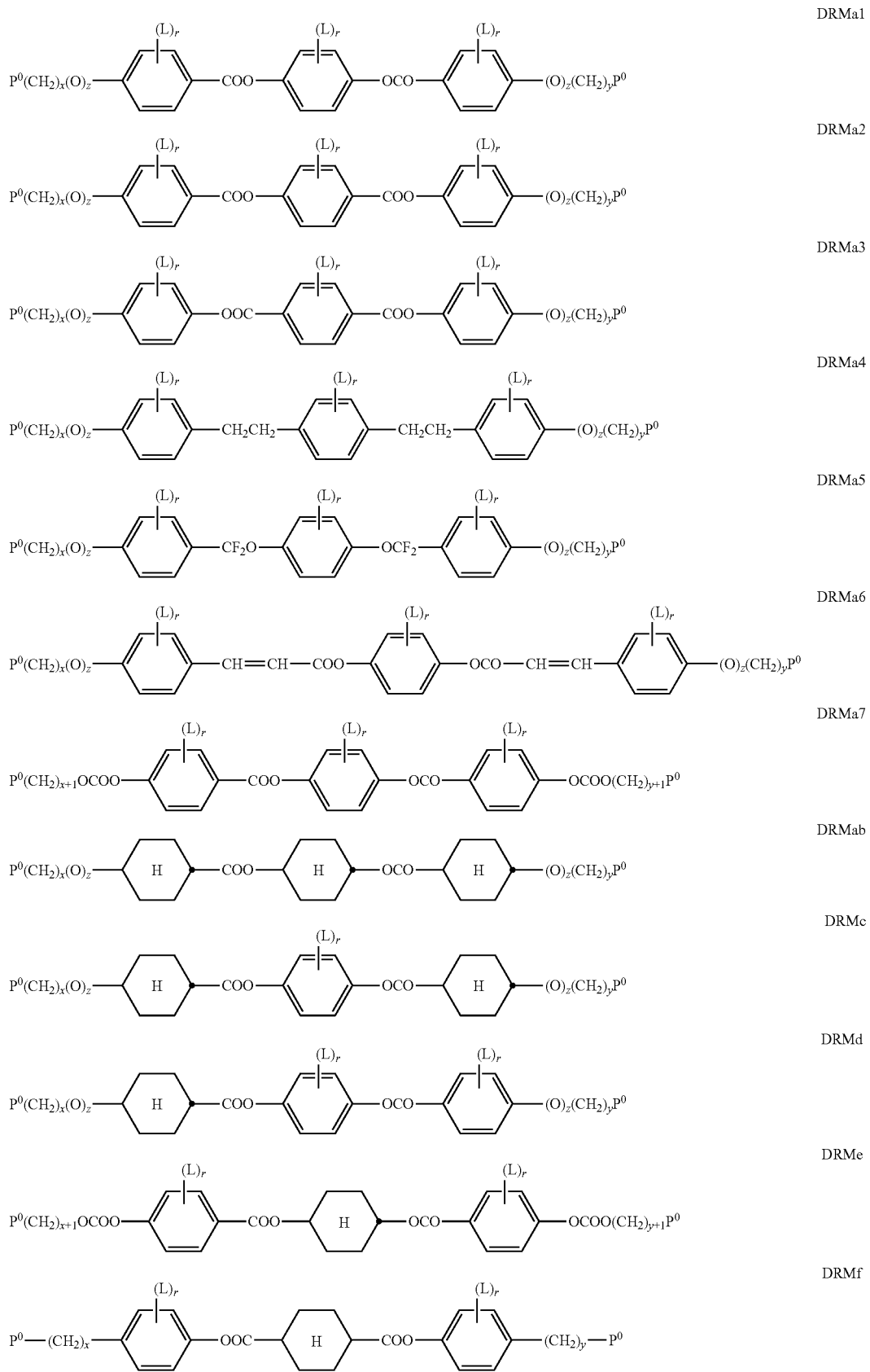

wherein,

P⁰ is, in case of multiple occurrence independently of one another a polymerizable group (P), L has each and independently in each occurrence one of the meanings as given above in formula T in claim 1, r is 0, 1, 2, 3 or 4, x and y are independently of each other 0 or identical or different integers from 1 to 12, z is each and independently, 0 or 1, with z being 0 if the adjacent x or y is 0.

10. The polymerizable LC material according to claim 9, wherein the one or more the monoreactive mesogenic compound MRM has the following formulae

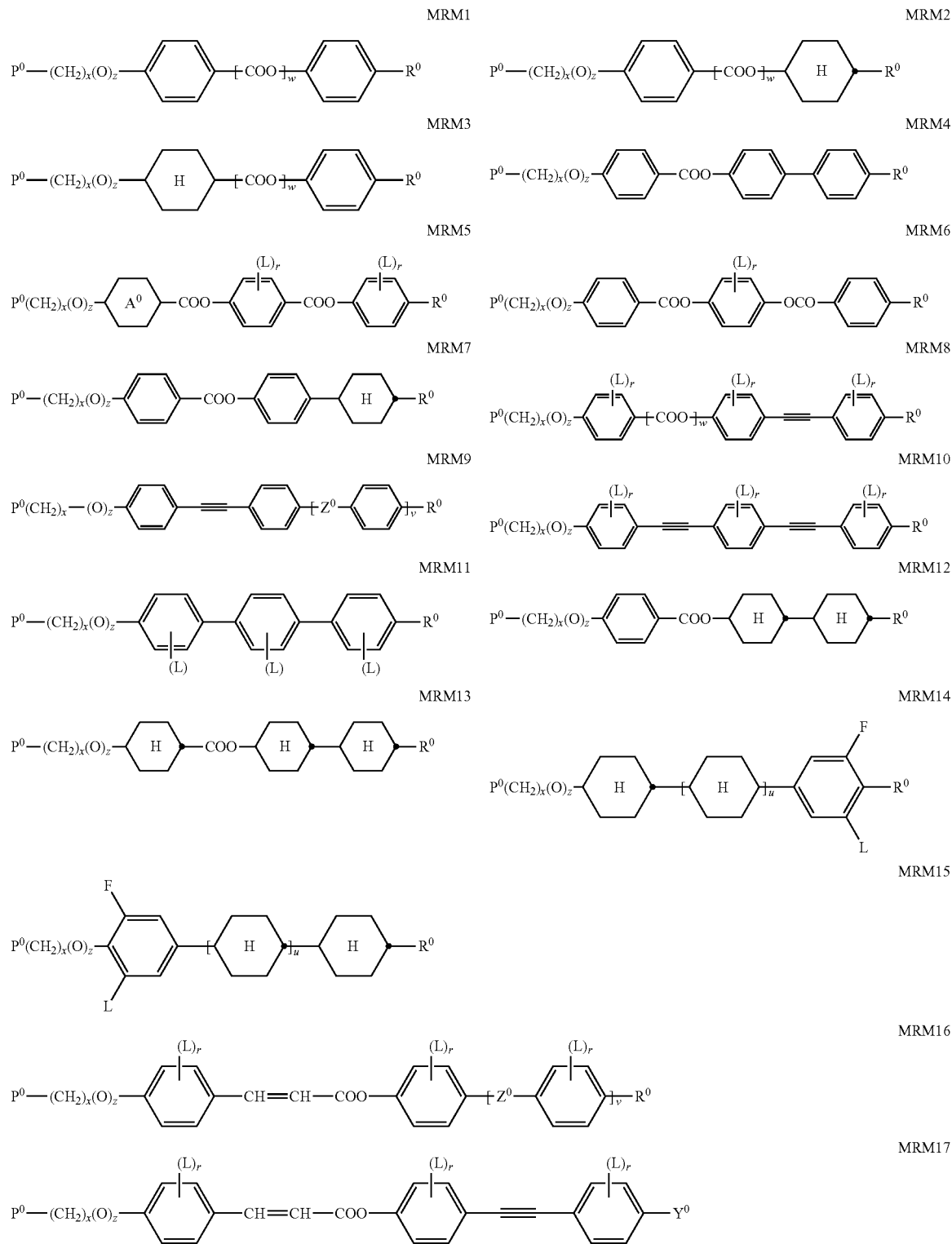

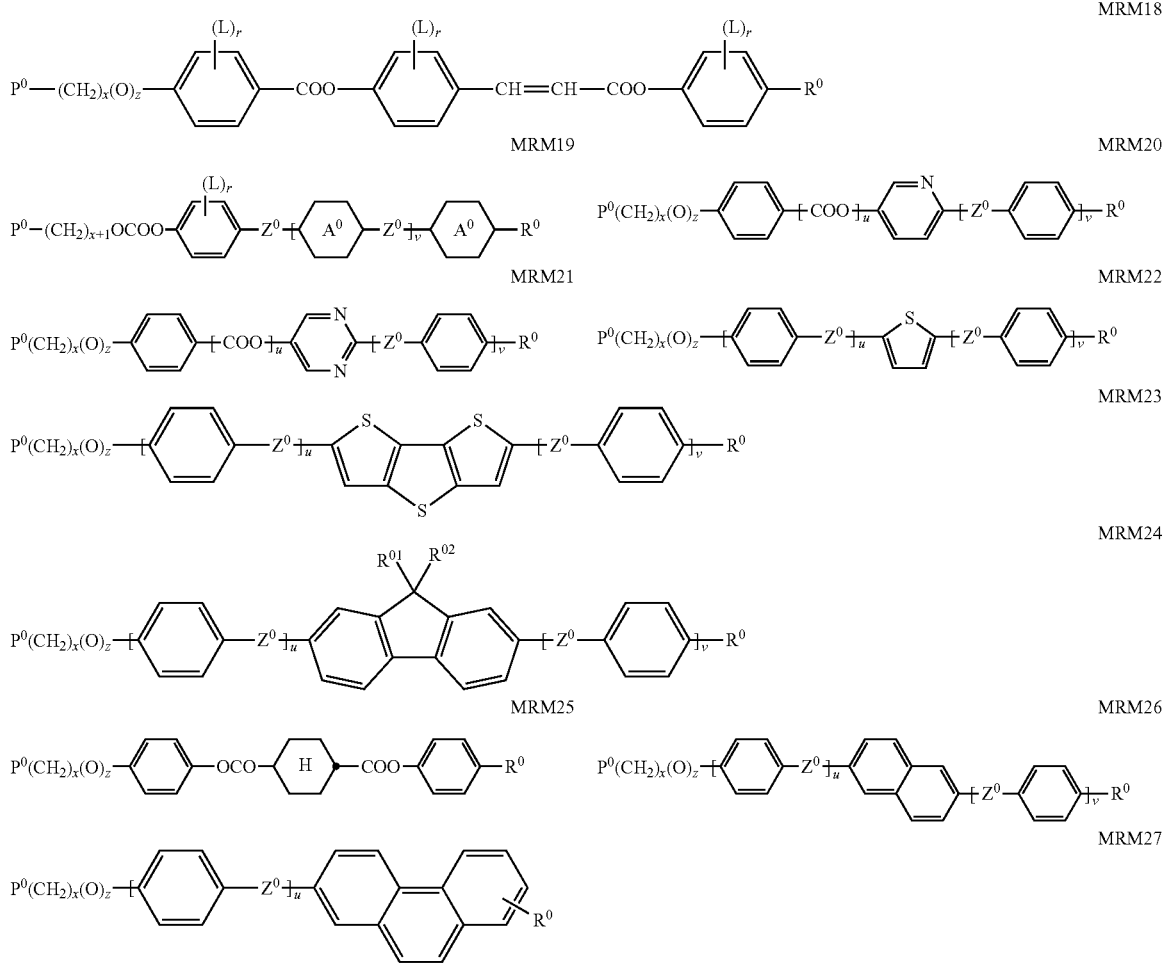

wherein
P⁰, L, r, x, y and z are as defined in formula DRMa-1 to formula DRMf in claim 9,
R⁰ is alkyl, alkoxy, thioalkyl, alkylcarbonyl, alkoxycarbonyl, alkylcarbonyloxy or alkoxycarbonyloxy with 1 to 15 C atoms or denotes Y⁰,
Y⁰ is F, Cl, CN, NO₂, OCH₃, OCN, SCN, SF₅, or mono- oligo- or polyfluorinated alkyl or alkoxy with 1 to 4 C atoms,
Z⁰ is —COO—, —OCO—, —CH₂CH₂—, —CF₂O—, —OCF₂—, —CH═CH—, —OCO—CH═CH—, —CH═CH—COO—, or a single bond,
A⁰ is, in case of multiple occurrence independently of one another, 1,4-phenylene that is unsubstituted or substituted with 1, 2, 3 or 4 groups L, or trans-1,4-cyclohexylene,
u and v are independently of each other 0, 1 or 2,
w is 0 or 1,
and wherein the benzene and naphthalene rings can additionally be substituted with one or more identical or different groups L.

11. The polymerizable LC material according to claim 1, comprising one or more antioxidants.

12. The polymerizable LC material according to claim 1, comprising optionally one or more additives selected from the group consisting of, surfactants, further stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

13. A process for the preparation of the polymerizable LC material according to claim 1 comprising mixing one or more compounds of formula CO-1 with one or more compounds of formula T.

14. A process for the preparation of a polymer film by
providing a layer of a polymerizable e LC material according to claim 1 onto a substrate,
photopolymerizing the polymerizable LC material, and
optionally removing the polymerised LC material from the substrate and/or optionally providing it onto another substrate.

15. A polymer film obtainable from a polymerizable LC material according to claim 1 by a process comprising
providing a layer of the polymerizable LC material onto a substrate,
photopolymerizing the LC material, and
optionally, removing the polymerized LC material from the substrate and/or optionally providing it onto another substrate.

16. The film according to claim 15, wherein the polymer exhibits positive, negative of flat dispersion.

17. A method of increasing the durability of a polymer film according to claim 16, obtained from a polymerizable LC material comprising one or more compounds of formula T, by adding at least one compound of formula CO-1, before polymerization.

18. Optical, electro optical, information storage, decorative or security applications, liquid crystal displays, 3D displays, projection systems, polarizers, compensators, alignment layers, circular polarizers, color filters, decorative images, liquid crystal pigments, reflective films with spatially varying reflection color, multicolor images, non-forgeable documents, identity documents, credit cards or banknotes comprising a polymer film according to claim 15.

19. Optical component or device, polarizer, patterned retarder, compensator, alignment layer, circular polarizer, color filter, decorative image, liquid crystal lens, liquid crystal pigment, reflective film with spatially varying reflection colors, multicolor image for decorative or information storage, comprising at least one polymer film according to claim 15.

20. The LC material according to claim 1, wherein $R^1$ and $R^2$ denote alkyl.

21. The LC material according to claim 1, wherein $L^1$ is H, halogen, CN, or $NO_2$.

22. The LC material according to claim 1, wherein $L^2$ and $L^3$ are H, alkyl, or -($Sp^{31}$-$A^{31}$), wherein $Sp^{31}$ denotes a spacer group or a single bond, and $A^{31}$ denotes an aryl, heteroaryl, (non-aromatic) alicyclic or heterocyclic group, optionally having one or more substituents, which are silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

23. The LC material according to claim 1, wherein $Sp^{31}$ is a single bond or $C_{1-12}$ alkylene radical.

24. The LC material according to claim 1, wherein $Sp^{31}$ is a single bond or $C_{1-6}$ alkylene radical.

25. The LC material according to claim 1, wherein $Sp^{31}$ is a single bond or $C_{1-2}$ alkylene radical.

26. The LC material according to claim 1, wherein $A^{31}$ denotes phenyl, cyclohexyl, or cyclopentyl.

27. The LC material according to claim 1, wherein the rod-shaped mesogenic group MG has formula MG $$-(A^{1D}-Z^{1D})_n-A^{2D}- \qquad \text{MG}$$

wherein
$A^{1D}$ and $A^{2D}$ denote, in case of multiple occurrence independently of one another, an aromatic or alicyclic group, which optionally contains one or more heteroatoms selected from N, O and S, and is optionally mono- or polysubstituted by $L^1$, $L^1$ has each and independently one of the meanings as given above in formula T, $Z^{1D}$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{000}$, —$NR^{00}$—CO—O—, —O—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$—, —$CF_2CH_2$—, —$CH_2CF_2$—, —$CF_2CF_2$—, —CH=N—, —N=CH—, —N=N—, —CH=$CR^{00}$—, —$CY^1$=$CY^2$—, —C≡C—, —CH=CH—COO—, —OCO—CH=CH— or a single bond, $R^{00}$ and $R^{000}$ independently of each other denote H or alkyl with 1 to 12 C-atoms, $Y^1$ and $Y^2$ independently of each other denote H, F, Cl or CN, n is 1, 2, 3 or 4, and n1 is an integer from 1 to 10.

* * * * *